(12) United States Patent
Wang et al.

(10) Patent No.: US 10,972,165 B2
(45) Date of Patent: Apr. 6, 2021

(54) BEAM DETERMINATION METHOD, DOWNLINK TRANSMISSION DEMODULATION METHOD, USER EQUIPMENT AND BASE STATION

(71) Applicant: NTT DOCOMO, INC., Tokyo (JP)

(72) Inventors: Jing Wang, Beijing (CN); Liu Liu, Beijing (CN); Huiling Jiang, Beijing (CN); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/347,083

(22) PCT Filed: Oct. 30, 2017

(86) PCT No.: PCT/CN2017/108336
§ 371 (c)(1),
(2) Date: May 2, 2019

(87) PCT Pub. No.: WO2018/082520
PCT Pub. Date: May 11, 2018

(65) Prior Publication Data
US 2019/0268056 A1    Aug. 29, 2019

(30) Foreign Application Priority Data

Nov. 3, 2016   (CN) .......................... 2016 1 0973697

(51) Int. Cl.
*H04B 7/02* (2018.01)
*H04L 1/02* (2006.01)
(Continued)

(52) U.S. Cl.
CPC ............. *H04B 7/0626* (2013.01); *H04B 7/06* (2013.01); *H04B 7/0617* (2013.01); *H04B 7/08* (2013.01)

(58) Field of Classification Search
CPC .......... H04B 7/0626; H04B 7/08; H04B 7/06; H04B 7/0617; H04B 7/0621; H04B 7/0695
(Continued)

(56) References Cited

U.S. PATENT DOCUMENTS

2010/0272077 A1   10/2010   van Rensburg et al.
2012/0052828 A1   3/2012    Kamel et al.
(Continued)

FOREIGN PATENT DOCUMENTS

CN   102415173 A   4/2012
CN   105245261 A   1/2016

OTHER PUBLICATIONS

International Search Report regarding PCT/CN2017/108336, dated Dec. 27, 2017.
(Continued)

*Primary Examiner* — Don N Vo
(74) *Attorney, Agent, or Firm* — Osha Bergman Watanabe & Burton

(57) ABSTRACT

A beam determination method, a downlink transmission decoding method performed in a communication system, and corresponding user equipments and base stations are disclosed. The base station has a plurality of transmission beams, and may dynamically select a beam for transmitting downlink control information and downlink data information from a plurality of beams. The downlink transmission decoding method performed by the user equipment includes: determining M preferred beams in the plurality of transmission beams of the base station; and receiving, through one or more reception beams corresponding to any one or more of N preferred beams in the M preferred beams, downlink control information transmitted by the base station, wherein N≤M, the base station transmitting signaling including same
(Continued)

downlink control information through the N preferred beams during the transmission time period of the downlink control information. The downlink transmission decoding method performed by the base station comprises: determining M preferred beams in the plurality of transmission beams of the base station; and transmitting signaling including same downlink control information through N preferred beams in the M preferred beams, where $N \leq M$.

5 Claims, 11 Drawing Sheets

(51) Int. Cl.
*H04B 7/06* (2006.01)
*H04B 7/08* (2006.01)

(58) Field of Classification Search
USPC .................................................. 375/262, 267
See application file for complete search history.

(56) References Cited

U.S. PATENT DOCUMENTS

| | | | |
|---|---|---|---|
| 2013/0156120 A1* | 6/2013 | Josiam | H04B 7/0697 375/260 |
| 2013/0286960 A1* | 10/2013 | Li | H04W 72/042 370/329 |
| 2014/0328266 A1 | 11/2014 | Yu et al. | |
| 2016/0087706 A1* | 3/2016 | Guey | H04L 5/005 375/267 |
| 2016/0095003 A1* | 3/2016 | Yu | H04B 7/0695 370/311 |
| 2016/0278118 A1 | 9/2016 | Yerramalli et al. | |
| 2017/0264417 A1* | 9/2017 | Eriksson | H04W 72/042 |
| 2017/0311301 A1* | 10/2017 | Yu | H04L 5/0091 |
| 2017/0367046 A1* | 12/2017 | Papasakellariou | H04L 5/0048 |
| 2018/0007731 A1* | 1/2018 | Park | H04W 76/15 |
| 2018/0242300 A1* | 8/2018 | Hakola | H04B 7/086 |
| 2020/0145079 A1* | 5/2020 | Marinier | H04W 74/0833 |

OTHER PUBLICATIONS

International Preliminary Report on Patentability regarding PCT/CN2017/108336, including the English translation of the Written Opinion, dated May 7, 2019.
Extended European Search Report issued in Application No. 17867952.8, dated Apr. 15, 2020 (12 pages).

* cited by examiner

BEAM DETERMINATION METHOD, DOWNLINK TRANSMISSION DEMODULATION METHOD, USER EQUIPMENT AND BASE STATION

CROSS REFERENCE TO RELATED APPLICATIONS

This application is a U.S. National Phase Application under 35 U.S.C. 371 of International Application No. PCT/CN2017/108336 filed on Oct. 30, 2017, which claims the benefit of priority from Chinese Patent Application No. 201610973697.X, filed on Nov. 3, 2016. The entire disclosures of the above applications are incorporated herein by reference.

TECHNICAL FIELD

The present disclosure relates to a field of communications, and in particular to a beam determination method, a downlink transmission demodulation method performed in a communication system, and corresponding user equipment and base station.

BACKGROUND

In a high-frequency scenario of 5G, or in a scenario where a user equipment (UE) is connected to a 5G transmission and reception point (base station) or a long-term evolution (LTE) base station through dual connectivity, it is proposed to use a beam forming technique in the UE and the base station, that is, both the base station and the UE may use a plurality of beams for signal transmission and reception. Each transmission beam of the base station and each reception beam of the UE may form one downlink beam pair, and each reception beam of the base station and each transmission beam of the UE may form one uplink beam pair. However, neither the signal transmitted through each downlink beam pair can obtain good reception quality at the UE, nor the signal transmitted through each uplink beam pair can obtain good reception quality at the base station.

Therefore, in order to improve the performance of a wireless communication system, in a transmission process of downlink control information and downlink data information, it is required to determine a preferred transmission beam of the base station and a preferred reception beam of the UE, so that the UE may use the preferred beam in the process of receiving downlink information transmitted by the base station. However, neither how to determine the preferred transmission beam of the base station and the preferred reception beam of the UE has not been proposed yet, nor how to demodulate the downlink control information and the downlink data information in downlink transmission to improve transmission quality.

SUMMARY OF THE INVENTION

According to one embodiment of the present disclosure, there is provided a beam determination method performed by a user equipment in a communication system including a base station and a user equipment, the base station having a plurality of transmission beams, the method comprising: transmitting, to the base station, CSI feedback for a transmission beam of the base station; determining, according to the CSI feedback for the transmission beam of the base station within a preset time window, a first transmission beam of the base station in all transmission beams of the base station having CSI feedback within the preset time window, and receiving, through a first reception beam corresponding to the first transmission beam, downlink control information transmitted by the base station through the first transmission beam. The transmission beam may be a CSI-RS based beam or a Synchronization Signal Block (SS block) based beam.

According to another embodiment of the present disclosure, there is provided a beam determination method performed by a base station in a communication system including a base station and a user equipment, the base station having a plurality of transmission beams, the method comprising: receiving CSI feedback transmitted by the user equipment for the transmission beam of the base station; determining, according to the CSI feedback for the transmission beam of the base station within a preset time window, a first transmission beam of the base station in all transmission beams of the base station having CSI feedback within the preset time window, and transmitting downlink control information through the first transmission beam.

According to another embodiment of the present disclosure, there is provided a user equipment, the user equipment being in a communication system, the communication system further including a base station, the base station having a plurality of transmission beams, wherein the user equipment comprising: a feedback unit configured to transmit CSI feedback for a transmission beam of the base station to the base station; a beam determination unit configured to determine, according to the CSI feedback for the transmission beam of the base station within a preset time window, a first transmission beam of the base station in all transmission beams of the base station having CSI feedback within the preset time window, and receiving, through a first reception beam corresponding to the first transmission beam, downlink control information transmitted by the base station through the first transmission beam.

According to another embodiment of the present disclosure, a base station is provided, the base station being in a communication system, the communication system further including a user equipment, the base station having a plurality of transmission beams, and the base station comprising: a reception unit configured to receive CSI feedback transmitted by the user equipment for the transmission beam of the base station; a first transmission unit configured to determine, according to the CSI feedback for the transmission beam of the base station within a preset time window, a first transmission beam of the base station in all transmission beams of the base station having CSI feedback within the preset time window, and transmitting downlink control information through the first transmission beam.

According to another embodiment of the present disclosure, there is provided a demodulation method for downlink transmission performed by a user equipment in a communication system including a base station and a user equipment, the base station having a plurality of transmission beams, the method comprising: determining M preferred beams in the plurality of transmission beams of the base station; receiving, through one or more reception beams corresponding to any one or more of N preferred beams in the M preferred beams, downlink control information transmitted by the base station, wherein N≤M, the base station transmitting signaling including same downlink control information through the N preferred beams during the transmission time period of the downlink control information.

According to another embodiment of the present disclosure, there is provided a demodulation method for downlink transmission performed by a base station in a communication system including a base station and a user equipment, the base station having a plurality of transmission beams, the method comprising: determining M preferred beams in the plurality of transmission beams of the base station; transmitting signaling including same downlink control information through N preferred beams in the M preferred beams, where N≤M.

According to another embodiment of the present disclosure, there is provided a user equipment, the user equipment being in a communication system, the communication system further including a base station, the base station having a plurality of transmission beams, wherein the user equipment comprising: a first preference selection unit, configured to determine M preferred beams in the plurality of transmission beams of the base station; an information reception unit configured to receive, through one or more reception beams corresponding to any one or more of N preferred beams in the M preferred beams, downlink control information transmitted by the base station, wherein N M, the base station transmitting signaling including same downlink control information through the N preferred beams during the transmission time period of the downlink control information.

According to another embodiment of the present disclosure, there is provided a base station, the base station being in a communication system, the communication system further including a user equipment, the base station having a plurality of transmission beams, wherein the base station comprising: a second preference selection unit configured to determine M preferred beams in the plurality of transmission beams of the base station; a second transmission unit configured to transmit signaling including same downlink control information through N preferred beams in the M preferred beams, where According to another embodiment of the present disclosure, there is provided a demodulation method for downlink transmission performed by a user equipment in a communication system including a base station and a user equipment, the base station having a plurality of transmission beams, the method comprising: determining relations between blind decoding candidate resource blocks in a search space configuration and the transmission beams of the base station, the blind decoding candidate resource blocks including one or more time-frequency elements; determining the transmission beam of the base station on the blind decoding candidate resource blocks according to the relations, and receiving downlink control information transmitted by the base station using reception beams corresponding to the transmission beams of the base station, to obtain resource blocks corresponding to the downlink control information and a corresponding second transmission beam.

According to another embodiment of the present disclosure, there is provided a demodulation method for downlink transmission performed by a base station in a communication system including a base station and a user equipment, the base station having a plurality of transmission beams, the method comprising: determining relations between blind decoding PDCCH candidate resource blocks in a search space configuration and the transmission beams of the base station, the blind decoding PDCCH candidate resource blocks including one or more time-frequency elements; determining a second transmission beam for transmitting downlink control information, and transmitting the downlink control information on the blind decoding candidate resource blocks corresponding to the determined second transmission beam according to the relations.

According to another embodiment of the present disclosure, there is provided a user equipment, the user equipment being in a communication system, the communication system further including a base station, the base station having a plurality of transmission beams, and the user equipment comprising: a first relation determination unit configured to determine relations between blind decoding PDCCH candidate resource blocks in a search space configuration and the transmission beams of the base station, the blind decoding candidate resource blocks including one or more time-frequency elements; a blind decoding reception unit configured to determine the transmission beam of the base station on the blind decoding candidate resource blocks according to the relations, and receiving downlink control information transmitted by the base station using reception beams corresponding to the transmission beams of the base station, to obtain resource blocks corresponding to the downlink control information and a corresponding second transmission beam.

According to another embodiment of the present disclosure, a base station is provided, he base station being in a communication system, the communication system further including a user equipment, the base station having a plurality of transmission beams, wherein the base station comprising: a second relation determination unit configured to determine relations between blind decoding candidate resource blocks in a search space configuration and the transmission beams of the base station, the blind decoding candidate resource blocks including one or more time-frequency elements; a third transmission unit configured to determine a second transmission beam for transmitting downlink control information, and transmitting the downlink control information on the blind decoding candidate resource blocks corresponding to the determined second transmission beam according to the relations.

The beam determination method, the demodulation method for the downlink transmission, and the corresponding user equipment and the base station performed by the communication system according to embodiments of the present disclosure, can enable the user equipment to determine the transmission beam of the base station through information interaction with the base station, and receive and decode, through selecting corresponding reception beam according to the determined transmission beam of the base station, the downlink control information and the downlink data information transmitted by the base station, thereby improving transmission quality of the information in the communication network.

BRIEF DESCRIPTION OF THE DRAWINGS

The above and other objects, features and advantages of the present disclosure will become more apparent by describing embodiments of the present disclosure in more details with reference to the drawings. The drawings are intended to provide a further understanding of the embodiments of the present disclosure, and to constitute a part of the specification, and are used to explain the present disclosure together with the embodiments of the present disclosure, and do not constitute a limitation for the present disclosure. In the drawings, the same reference numerals generally refer to the same parts or steps.

DESCRIPTION OF THE EMBODIMENTS

In order to make the objects, technical solutions and advantages of the present disclosure more apparent, exemplary embodiments according to the present disclosure will be described in detail below with reference to the drawings. It is apparent that the described embodiments are only a part of the embodiments of the present disclosure, and not all of the embodiments of the present disclosure. It should be understood that the present disclosure is not limited to the exemplary embodiments described herein. Based on the embodiments of the present disclosure described in the present disclosure, all other embodiments obtained by a person skilled in the art without creative work are intended to fall within the protection scope of the present disclosure.

Figure 1:
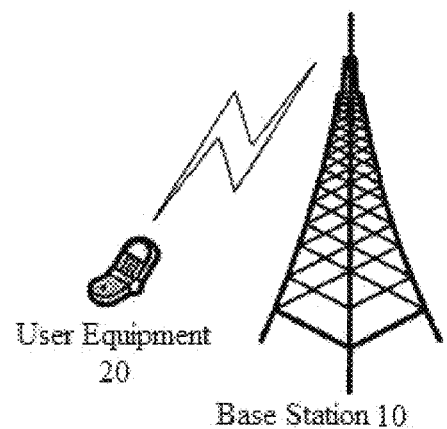
FIG. 1 is a schematic diagram of a mobile communication system according to an embodiment of the present disclosure.

Firstly, a wireless communication system according to an embodiment of the present disclosure is described with reference to FIG. 1. As shown in FIG. 1, the wireless communication system may include a base station 10 and a user equipment (UE) 20. The UE 20 may receive a downlink PDCCH and PDSCH transmitted by the base station 10. It needs to be appreciated that although one base station and one UE are shown in FIG. 1, this is merely illustrative and the wireless communication system may include one or more base stations and one or more UEs. Moreover, the base station 10 may be a transmission and reception point (TRP), or may schedule and manage a plurality of TRPs with a same central processor. Hereinafter, terms "base station" and "TRP" can be used interchangeably.

In the above process, the base station 10 may have a plurality of directional antennas, that is, a plurality of transmission beams, so that signals may be transmitted to the UE by using the plurality of transmission beams. Moreover, in some scenarios, the UE 20 may have a plurality of directional antennas, that is, a plurality of reception beams, so that signals transmitted by the base station may be received with the plurality of reception beams. Herein, the UE 20 may use all the reception beams to receive information transmitted by the base station, or may select a certain number of reception beams among all the reception beams to receive the information, and may also use a plurality of reception beams to form a quasi-omnidirectional antenna to receive the information. In some other scenarios, the UE 20 may have an omnidirectional antenna, so that the information is transmitted and received with only one beam (omnidirectional beam). A beam determination method of the embodiment of the present disclosure is applicable to both a scenario in which the UE 20 has a plurality of reception beams and a scenario in which the UE 20 has an omnidirectional antenna.

Figure 2:
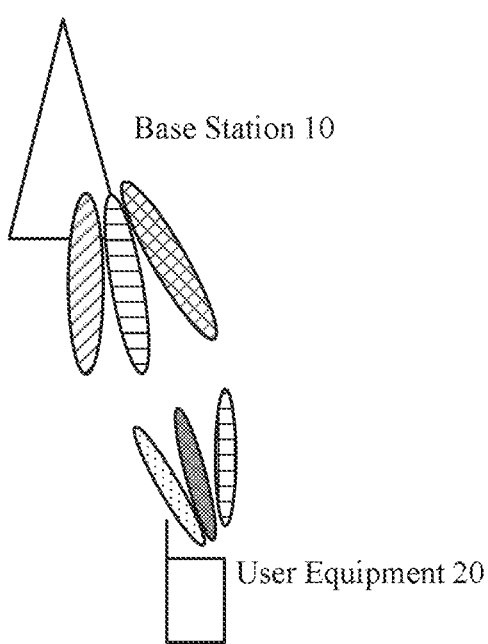
FIG. 2 schematically shows an exemplary diagram of information transmission of an embodiment of the present disclosure.

FIG. 2 shows an exemplary diagram of information transmission according to an embodiment of the present disclosure. As shown in FIG. 2, in the case that the base station 10 may form a plurality of transmission beams and the UE 20 may form a plurality of reception beams, when the base station 10 transmits downlink control information (PDCCH) and/or downlink data information (PDSCH) to the UE 20, the UE 20 wants to know the transmission beam used by the base station 10 and preferably select reception beam corresponding to the transmission beam from the plurality of reception beams of UE to improve reception quality of the information. Therefore, it is necessary to enable the UE 20 to learn the transmission beam used by the base station for transmitting downlink information.

Embodiments of the present disclosure provide a beam determination method for the base station and the user equipment, to enable the UE 20 to determine transmission beam used by the base station for transmitting the downlink control information and the downlink data information by utilizing information interaction between the base station 10 and the UE 20.

Beam information in embodiments of the present disclosure indicates beam forming information, that is, spatial relation information. Beam forming can be performed based on SSB reference information, or CSI-RS signal, therefore, beam-index may be SS block index, or CSI-RS index.

First Embodiment

Hereinafter, a beam determination method according to the first embodiment of the present disclosure, in which a base station has a plurality of transmission beams, will be described.

Figure 3:
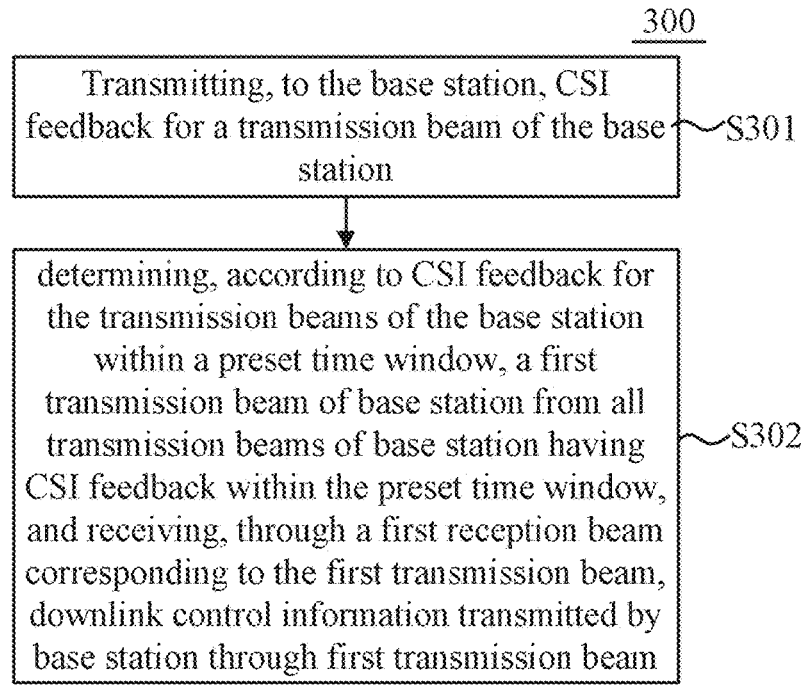
FIG. 3 is a flowchart of a beam determination method performed by a user equipment according to a first embodiment of the present disclosure.

FIG. 3 shows a beam determination method performed by a UE according to the first embodiment of the present disclosure. Through this method, the UE can determine available transmission beam of the base station and reception beam of the UE corresponding to the available transmission beam, and receive downlink control information and downlink data information transmitted by the base station with this reception beam.

As shown in FIG. 3, in step S301, CSI feedback for all or part of the transmission beams of the base station is transmitted to the base station. Specifically, for all or part of the transmission beams of the base station, the UE feeds back their corresponding CSI (Channel State Information) to the base station. The CSI fed back by the UE may be periodic feedback or non-periodic feedback.

Figure 4:
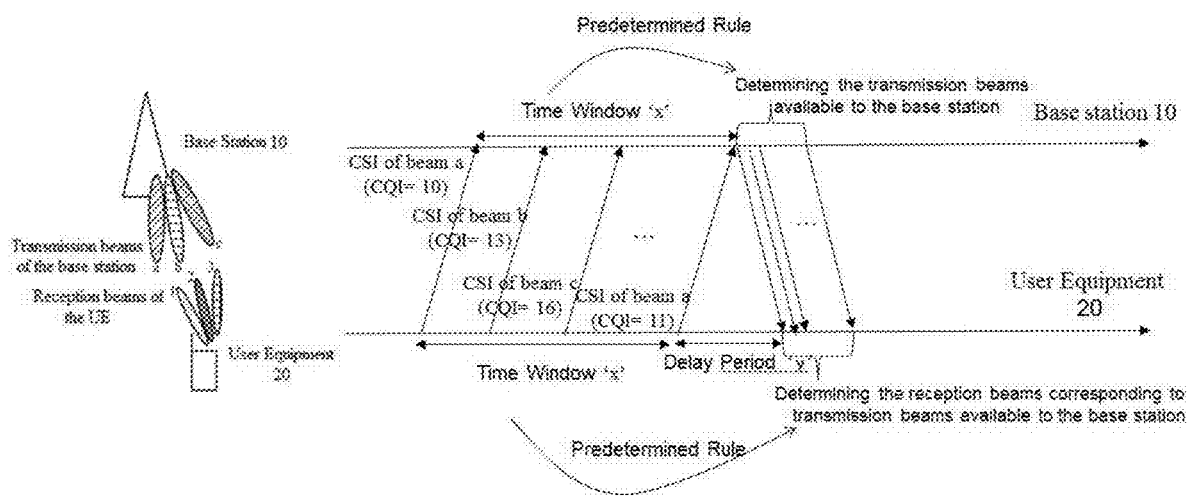
FIG. 4 shows a schematic diagram of selecting transmission and reception beam at a base station side and a UE side respectively, in a first embodiment of the present disclosure.
Figure 5:
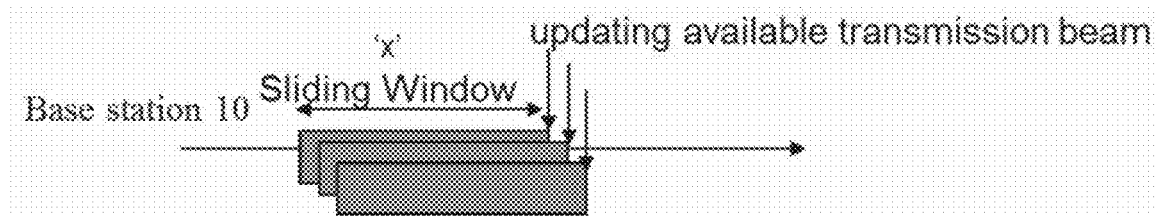
FIG. 5 shows a schematic diagram of an example in which a preset time window x is a sliding window in a first embodiment of the present disclosure.

In step S302, the UE determines, according to the CSI feedback for the transmission beams of the base station within a preset time window, a first transmission beam of the base station in all transmission beams of the base station for which there are CSI feedback within the range of the preset time window, and receives, through a first reception beam corresponding to the first transmission beam, the downlink control information transmitted by the base station through the first transmission beam. FIG. 4 shows a schematic diagram of selecting corresponding transmission and reception beams at a base station side and a UE side according to the CSI feedback, respectively, in one embodiment of the present disclosure. Wherein, before data transmission, it has been determined that three preferred transmission beams a, b, and c for the user in total at the base station side, and the reception beams corresponding to the transmission beams respectively at the UE side are 1, 2, and 3. As shown in FIG. 4, an available transmission beam that meets a predetermined rule is selected at the base station side as the first transmission beam according to the CSI feedback of the UE for its respective transmission beams in a past preset time window x, and the downlink control information is transmitted through the selected first transmission beam. In one embodiment of the present disclosure, the preset time window x may be predetermined and defined by LTE specification, or configured by RRC (Radio Resource Control) signaling. FIG. 5 shows a schematic diagram of an example in which the preset time window x is a sliding window in one embodiment of the present disclosure. Specifically, the length of the preset time window may be a fixed length x, while x being sliding change over the entire time axis, and for the base station, after the end of each time window of length x, the first transmission beam for transmitting downlink information is re-updated. Correspondingly, the UE may also judge the first transmission beam available to the base station according to the predetermined rule after the end of each sliding time window x. Returning to FIG. 4, in a preferred embodiment, the UE may expect to determine the first transmission beam available to the base station after a preset delay period y following each time window x, in order to have sufficient processing time to have a same understanding of beam update with the base station. This delay period y may also be predetermined and defined by the LTE specification, or configured by RRC signaling.

In the foregoing embodiment, the selection of the first transmission beam of the base station may follow a plurality of predetermined rules. For example, the first transmission beam of the base station may be selected according to a parameter indicating a channel state in the CSI feedback for the transmission beams of the base station. Alternatively, the parameter indicating a channel state may be a CQI (Channel Quality Indicator). Specifically, the method for determining the first transmission beam of the base station may include: selecting from the plurality of transmission beams of the base station, within the preset time window, a beam with a highest CQI as the first transmission beam; selecting, within the preset time window, a beam with a highest average CQI as the first transmission beam when the plurality of transmission beams of the base station have multiple CSI feedback and a plurality of CQI values are obtained; selecting from the plurality of transmission beams of the base station, within the preset time window, a beam whose CQI is greater than a predetermined threshold or a threshold configured by RRC and whose corresponding CSI feedback time is closest (that is, closest to an end point of the preset time window), as the first transmission beam; selecting, within the preset time window, a beam whose CQI is greater than the predetermined threshold for over a reference number of times and whose corresponding CSI feedback time is closest to the end point of the preset time window, or a beam whose average CQI is greater than the predetermined threshold and whose corresponding CSI feedback time is closest to the end point of the preset time window, as the first transmission beam, when the plurality of transmission beams of the base station have a plurality of CSI feedback. Herein, once a beam selection rule is determined, both the base station side and the UE side will follow the same rule to determine the transmission beam of the base station. For example, in the embodiment shown in FIG. 4, in the time window x, for the transmission beam a of the base station, the CQI value of the CSI feedback of the UE is 10; for the transmission beam b, the CQI value fed back by the UE is 13; for the transmission beam c, the CQI value fed back by the UE is 16; then again for the transmission beam a, the CQI value fed back by the UE is 11. At the base station side, after the end of the time window of length x, the first transmission beam available to the base station may be selected according to the predetermined rule; while at the UE side, the first transmission beam available to the base station is determined after the preset delay period y following the preset time window of length x. In this embodiment, when the predetermined rule is to select the transmission beam with the highest CQI value, both the base station side and the UE side will follow this rule to select the transmission beam c of the base station as the first transmission beam, and the UE side will receive, after having selected the transmission beam c as the first transmission beam of the base station, through the first reception beam 3 corresponding to the transmission beam c, the downlink information transmitted by the base station through the first transmission beam c. When the predetermined rule is to select a beam whose CQI is greater than the predetermined threshold (for example, 9) and whose corresponding CSI feedback time is closest, both the base station side and the UE side will select the transmission beam a as the first transmission beam, and the UE side will receive, through the first transmission beam 1 corresponding to the transmission beam a, the downlink control information transmitted by the base station.

In one embodiment of the present disclosure, the UE side may receive downlink control information (DCI) transmitted by the base station through a physical downlink control channel (PDCCH). Moreover, in the embodiment of the present disclosure, when it is determined that the base station carries out PDCCH transmission through the first transmission beam, the base station may have the following two options for a transmission mode of a physical downlink shared channel (PDSCH): 1) carrying out the PDSCH transmission through the above first transmission beam; 2) indicating the transmission beam for PDSCH transmission by information that indicates beams included in the DCI transmitted by the first transmission beam, and transmitting the downlink data information through the determined beam. Correspondingly, the UE also needs to determine the transmission beams of the base station for PDSCH transmission for the above two modes of the base station respectively, and select the preferred reception beam corresponding thereto to receive the downlink data information. The transmission beam may be a CSI-RS based beam or an SS block based beam. The information that indicates a beam in the PDCCH beam in a RRC configuration signaling used for configuring relations of a beam-search space time-frequency resources related to PDCCH beam sweeping, or in the DCI, may include one or more of beam information (beam-index), channel state information reference signal port (CSI-RS port), channel state information reference signal configuration (CSI-RS configuration) or CSI-RS index, beam reference signal configuration, codebook, code word, precoding information indication, spatial parameters or spatial relation information, and Synchronization Signal (SS) block index.

The beam determination method performed in the communication system according to the embodiment of the present disclosure can enable the user equipment to determine the transmission beam of the base station by utilizing information interaction with the base station, and select, via its determined transmission beam of base station, the corresponding reception beam to receive the downlink control information an d the downlink data information transmitted by the base station, thereby improving transmission quality of the information in communication network.

Hereinafter, a beam determination method performed by the base station according to the first embodiment of the present disclosure will be described. Since most of the operations of the method have been described above in describing the beam determination method performed by the UE, the description of the same content is omitted herein to avoid redundancy.

Figure 6:
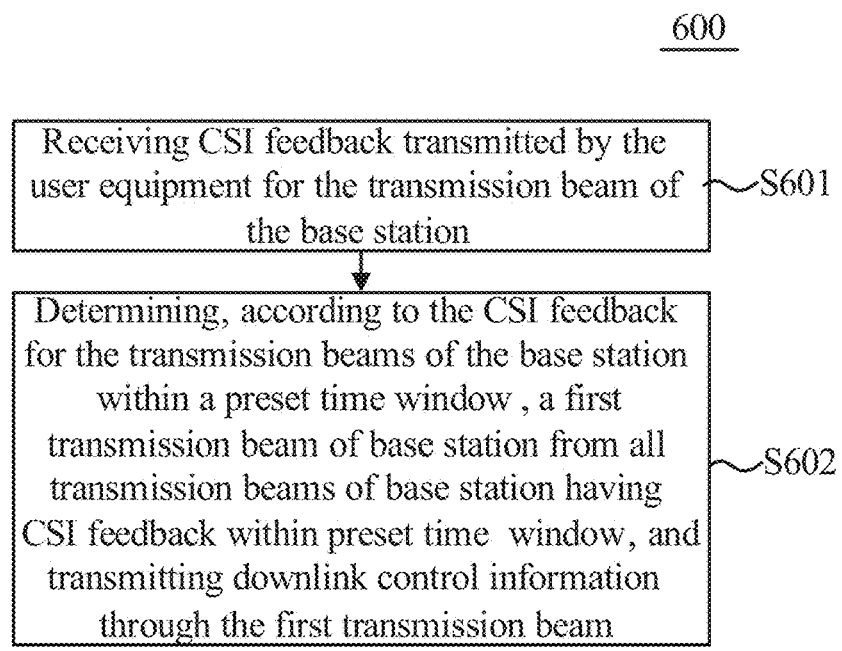
FIG. 6 shows a flowchart of a beam determination method performed by a base station according to a first embodiment of the present disclosure.

FIG. 6 shows the beam determination method performed by the base station according to the first embodiment of the present disclosure. Through this method, the base station can determine the available transmission beam of the base station, and transmit the downlink control information and downlink data information through the transmission beam.

As shown in FIG. 6, in step S601, the base station receives CSI feedback transmitted by the user equipment for all or part of the transmission beams of the base station. Specifically, for all or part of the transmission beams of the base station, the UE feeds back their corresponding CSI (channel state information) to the base station. The CSI fed back by the UE may be periodic feedback or non-periodic feedback.

In step S602, the base station determines, according to the CSI feedback for the transmission beams of the base station within a preset time window, a first transmission beam of the base station in all transmission beams of the base station having CSI feedback within the range of the preset time window, and transmits the downlink control information through the first transmission beam. FIG. 4 shows the schematic diagram of selecting corresponding transmit and reception beams at the base station side and the UE side according to the CSI feedback, respectively, in one embodiment of the present disclosure. Wherein, before data transmission, it has been determined that three preferred transmission beams a, b, and c for the user in total at the base station side, and the reception beams corresponding to the transmission beams respectively at the UE side are 1, 2, and 3. As shown in FIG. 4, the available transmission beam that meets the predetermined rule is selected at the base station side as the first transmission beam according to the CSI feedback of the UE for its respective transmission beams in the past preset time window x, and the downlink control information is transmitted through the selected first transmission beam. In one embodiment of the present disclosure, the preset time window x may be predetermined and defined by the LTE specification, or configured by the RRC (Radio Resource Control) signaling. FIG. 5 shows the schematic diagram of an example in which the preset time window x is the sliding window in one embodiment of the present disclosure. Specifically, the length of the preset time window may be the fixed length x, while x being sliding change over the entire time axis, and for the base station, after the end of each time window of length x, the first transmission beam for transmitting downlink information is re-updated. Correspondingly, the UE may also judge the first transmission beam available to the base station according to the predetermined rule after the end of each sliding time window x.

In the foregoing embodiment, the selection of the first transmission beam of the base station may follow the plurality of predetermined rules. For example, the first transmission beam of the base station may be selected according to the parameter indicating a channel state in the CSI feedback for the transmission beams of the base station. Alternatively, the parameter indicating the channel state may be the CQI (Channel Quality Indicator). Specifically, the method for determining the first transmission beam of the base station may include: selecting from the plurality of transmission beams of the base station, within the preset time window, the beam with a highest CQI as the first transmission beam; selecting, within the preset time window, the beam with the highest average CQI as the first transmission beam when the plurality of transmission beams of the base station have multiple CSI feedback and a plurality of CQI values are obtained; selecting from the plurality of transmission beams of the base station, within the preset time window, the beam whose CQI is greater than a predetermined threshold or a threshold configured by RRC and whose corresponding CSI feedback time is closest (that is, closest to the end point of the preset time window), as the first transmission beam; selecting, within the preset time window, the beam whose CQI is greater than the predetermined threshold for over a reference number of times and whose corresponding CSI feedback time is closest to the end point of the preset time window, or the beam whose average CQI is greater than the predetermined threshold and whose corresponding CSI feedback time is closest to the end point of the preset time window, as the first transmission beam, when the plurality of transmission beams of the base station have the plurality of CSI feedback. Herein, once the beam selection rule is determined, both the base station side and the UE side will follow the same rule to determine the transmission beam of the base station. For example, in the embodiment shown in FIG. 4, in the time window x, for the transmission beam a of the base station, the CQI value of the CSI feedback of the UE is 10; for the transmission beam b, the CQI value fed back by the UE is 13; for the transmission beam c, the CQI value fed back by the UE is 16; then again for the transmission beam a, the CQI value fed back by the UE is 11. At the base station side, after the end of the time window of length x, the first transmission beam available to the base station may be selected according to the predetermined rule; while at the UE side, the first transmission beam available to the base station is determined after the preset delay period y following the preset time window of length x. In this embodiment, when the predetermined rule is to select the transmission beam with the highest CQI value, both the base station side and the UE side will follow this rule to select the transmission beam c of the base station as the first transmission beam, and the UE side will receive, after having selected the transmission beam c as the first transmission beam of the base station, through the first reception beam 3 corresponding to the transmission beam c, the downlink information transmitted by the base station through the first transmission beam c. When the predetermined rule is to select the beam whose CQI is greater than the predetermined threshold (for example, 9) and whose corresponding CSI feedback time is closest, both the base station side and the UE side will select the transmission beam a as the first transmission beam, and the UE side will receive, through the first transmission beam 1 corresponding to the transmission beam a, the downlink control information transmitted by the base station.

In one embodiment of the present disclosure, the downlink information transmitted by the base station side may be the DCI transmitted through the physical downlink control channel (PDCCH). Moreover, in the embodiment of the present disclosure, when it is determined that the base station carries out PDCCH transmission through the first transmission beam, the base station may have the following two options for a transmission mode of a physical downlink shared channel (PDSCH): 1) carrying out the PDSCH transmission through the above first transmission beam; 2) indicating the transmission beam for PDSCH transmission by information that indicates beams included in the DCI transmitted by the first transmission beam, and transmitting the downlink data information through the determined beam. Correspondingly, the UE also needs to determine the transmission beams of the base station for PDSCH transmission for the above two modes of the base station respectively, and select the preferred reception beam corresponding thereto to receive the downlink data information. The transmission beam may be a CSI-RS based beam or an SS block based beam. The information that indicates a beam in the PDCCH beam in a RRC configuration signaling used for configuring relations of a beam-search space time-frequency resources related to PDCCH beam sweeping, or in the DCI, may include one or more of beam information (beam-index), channel state information reference signal port (CSI-RS port), channel state information reference signal configuration (CSI-RS configuration) or CSI-RS index, beam reference signal configuration, codebook, code word, precoding information indication, spatial parameters or spatial relation information, and Synchronization Signal (SS) block index.

The beam determination method performed in the communication system according to the embodiment of the present disclosure can enable the user equipment to determine the transmission beam of the base station by utilizing information interaction with the base station, and select, via its determined transmission beam of base station, the corresponding reception beam to receive the downlink control information and the downlink data information transmitted by the base station, thereby improving transmission quality of the information in communication network.

Hereinafter, the UE according to the first embodiment of the present disclosure will be described with reference to FIG. 7. The UE may perform the beam determination method described above. Since the operation of the UE is substantially the same as the respective steps of the beam determination method described above, only a brief description of the UE is made herein, and a repeated description of the same content is omitted.

Figure 7:
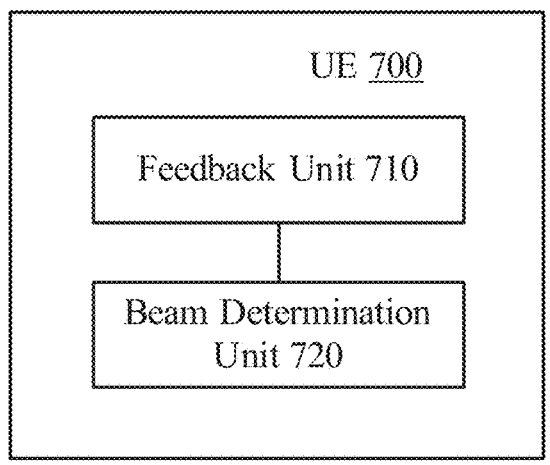
FIG. 7 shows a block diagram of a structure of a UE according to a first embodiment of the present disclosure.

As shown in FIG. 7, a UE 700 includes a feedback unit 710 and a beam determination unit 720. It needs to be appreciated that FIG. 7 only shows means related to the embodiment of the present disclosure, while other means are omitted. But this is merely illustrative, and the UE 700 may include other means as needed.

The feedback unit 710 may transmit CSI feedback for all or part of the transmission beams of the base station to the base station. Specifically, for all or part of the transmission beams of the base station, the feedback unit 710 feeds back their corresponding CSI (channel state information) to the base station. The CSI fed back by the UE may be periodic feedback or non-periodic feedback.

The beam determination unit 720 may determine, according to the CSI feedback for the transmission beams of the base station within the preset time window, the first transmission beam of the base station in all transmission beams of the base station having CSI feedback within the preset time window, and receiving, through the first reception beam corresponding to the first transmission beam, downlink control information transmitted by the base station through the first transmission beam. FIG. 4 shows the schematic diagram of selecting corresponding transmit and reception beams at the base station side and the UE side according to the CSI feedback, respectively, in one embodiment of the present disclosure. Wherein, before data transmission, it has been determined that three preferred transmission beams a, b, and c for the user in total at the base station side, and the reception beams corresponding to the transmission beams respectively at the UE side are 1, 2, and 3. As shown in FIG. 4, the available transmission beam that meets the predetermined rule is selected at the base station side as the first transmission beam according to the CSI feedback of the UE for its respective transmission beams in the past preset time window x, and the downlink control information is transmitted through the selected first transmission beam. In one embodiment of the present disclosure, the preset time window x may be predetermined and defined by the LTE specification, or configured by the RRC (Radio Resource Control) signaling. FIG. 5 shows the schematic diagram of an example in which the preset time window x is the sliding window in one embodiment of the present disclosure. Specifically, the length of the preset time window may be the fixed length x, while x being sliding change over the entire time axis, and for the base station, after the end of each time window of length x, the first transmission beam for transmitting downlink information is re-updated. Correspondingly, the UE may also judge the first transmission beam available to the base station according to the predetermined rule after the end of each sliding time window x. Returning to FIG. 4, in the preferred embodiment, the UE may expect to determine the first transmission beam available to the base station after the preset delay period y following each time window x, in order to have sufficient processing time to have the same understanding of beam update with the base station. This delay period y may also be predetermined and defined by the LTE specification or configured by RRC signaling. Returning to FIG. 4, in the preferred embodiment, the beam determination unit 720 may expect to determine the first transmission beam available to the base station after a preset delay period y following each time window x, in order to have sufficient processing time to have a same understanding of beam update with the base station. This delay period y may also be predetermined and defined by the LTE specification or configured by RRC signaling.

In the foregoing embodiment, the selection of the first transmission beam of the base station may follow the plurality of predetermined rules. For example, the first transmission beam of the base station may be selected according to the parameter indicating a channel state in the CSI feedback for the transmission beams of the base station. Alternatively, the parameter indicating the channel state may be the CQI (Channel Quality Indicator). Specifically, the method for determining the first transmission beam of the base station may include: selecting from the plurality of transmission beams of the base station, within the preset time window, the beam with a highest CQI as the first transmission beam; selecting, within the preset time window, the beam with the highest average CQI as the first transmission beam when the plurality of transmission beams of the base station have multiple CSI feedback and a plurality of CQI values are obtained; selecting from the plurality of transmission beams of the base station, within the preset time window, the beam whose CQI is greater than a predetermined threshold or a threshold configured by RRC and whose corresponding CSI feedback time is closest (that is, closest to the end point of the preset time window), as the first transmission beam; selecting, within the preset time window, the beam whose CQI is greater than the predetermined threshold for over a reference number of times and whose corresponding CSI feedback time is closest to the end point of the preset time window, or the beam whose average CQI is greater than the predetermined threshold and whose corresponding CSI feedback time is closest to the end point of the preset time window, as the first transmission beam, when the plurality of transmission beams of the base station have the plurality of CSI feedback. Herein, once the beam selection rule is determined, both the base station side and the UE side will follow the same rule to determine the transmission beam of the base station. For example, in the embodiment shown in FIG. 4, in the time window x, for the transmission beam a of the base station, the CQI value of the CSI feedback of the UE is 10; for the transmission beam b, the CQI value fed back by the UE is 13; for the transmission beam c, the CQI value fed back by the UE is 16; then again for the transmission beam a, the CQI value fed back by the UE is 11. At the base station side, after the end of the time window of length x, the first transmission beam available to the base station may be selected according to the predetermined rule; while at the UE side, the first transmission beam available to the base station is determined by the beam determination unit 720 after the preset delay period y following the preset time window of length x. In this embodiment, when the predetermined rule is to select the transmission beam with the highest CQI value, both the base station side and the UE side will follow this rule to select the transmission beam c of the base station as the first transmission beam, and the beam determination unit 720 at the UE side will receive, after having selected the transmission beam c as the first transmission beam of the base station, through the first reception beam 3 corresponding to the transmission beam c, the downlink information transmitted by the base station through the first transmission beam c. When the predetermined rule is to select the beam whose CQI is greater than the predetermined threshold (for example, 9) and whose corresponding CSI feedback time is closest, both the base station side and the UE side will select the transmission beam a as the first transmission beam, and the beam determination unit 720 at the UE side will receive, through the first transmission beam 1 corresponding to the transmission beam a, the downlink control information transmitted by the base station.

In one embodiment of the present disclosure, the beam determination unit 720 on the UE side may receive downlink control information (DCI) transmitted by the base station through the physical downlink control channel (PDCCH). Moreover, in the embodiment of the present disclosure, when it is determined that the base station carries out PDCCH transmission through the first transmission beam, the base station may have the following two options for a transmission mode of a physical downlink shared channel (PDSCH): 1) carrying out the PDSCH transmission through the above first transmission beam; 2) indicating the transmission beam for PDSCH transmission by information that indicates beams included in the DCI transmitted by the first transmission beam, and transmitting the downlink data information through the determined beam. Correspondingly, the beam determination unit 720 also needs to determine the transmission beams of the base station for PDSCH transmission for the above two modes of the base station respectively, and select the preferred reception beam corresponding thereto to receive the downlink data information. The transmission beam may be a CSI-RS based beam or an SS block based beam. The information that indicates a beam in the PDCCH beam in a RRC configuration signaling used for configuring relations of a beam-search space time-frequency resources related to PDCCH beam sweeping, or in the DCI, may include one or more of beam information (beam-index), channel state information reference signal port (CSI-RS port), channel state information reference signal configuration (CSI-RS configuration) or CSI-RS index, beam reference signal configuration, codebook, code word, precoding information indication, spatial parameters or spatial relation information, and Synchronization Signal (SS) block index.

The UE in the communication system provided according to the embodiment of the present disclosure can enable the user equipment to determine the transmission beam of the base station by utilizing information interaction with the base station, and select, via its determined transmission beam of base station, the corresponding reception beam to receive the downlink control information and the downlink data information transmitted by the base station, thereby improving transmission quality of the information in communication network.

Hereinafter, the base station according to the first embodiment of the present disclosure will be described with reference to FIG. 8. The base station may perform the beam determination method described above. Since the operation of the base station is substantially the same as the respective steps of the beam determination method described above, only a brief description of the UE is made herein, and a repeated description of the same content is omitted.

Figure 8:
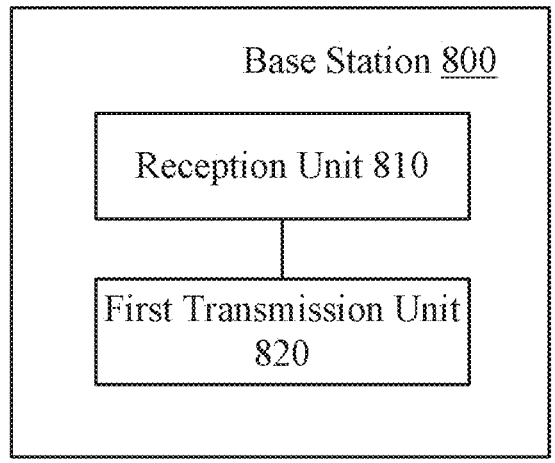
FIG. 8 shows a block diagram of a structure of a base station according to a first embodiment of the present disclosure.

As shown in FIG. 8, a base station 800 includes a reception unit 810 and a first transmission unit 820. It needs to be appreciated that FIG. 8 only shows means related to embodiment of the present disclosure, while other means are omitted. But this is merely illustrative, and base station 800 may include other means as needed.

The reception unit 810 receives CSI feedback transmitted by the user equipment for all or part of the transmission beams of the base station. Specifically, for all or part of the base station to transmission beams, the UE feeds back their corresponding CSI (channel state information) to the base station. The CSI fed back by the UE may be periodic feedback or non-periodic feedback.

The first transmission unit 820 determines, according to the CSI feedback for the transmission beam of the base station within the preset time window, the first transmission beam of the base station in all transmission beams of the base station having CSI feedback within the preset time window, and transmitting the downlink control information through the first transmission beam. FIG. 4 shows the schematic diagram of selecting corresponding transmit and reception beams at the base station side and the UE side according to the CSI feedback, respectively, in one embodiment of the present disclosure. Wherein, before data transmission, it has been determined that three preferred transmission beams a, b, and c for the user in total at the base station side, and the reception beams corresponding to the transmission beams respectively at the UE side are 1, 2, and 3. As shown in FIG. 4, the first transmission unit 820 at the base station side selects the available transmission beam that meets the predetermined rule as the first transmission beam according to the CSI feedback of the UE for its respective transmission beams in the past preset time window x, and transmits the downlink control information through the selected first transmission beam. In one embodiment of the present disclosure, the preset time window x may be predetermined, and defined by the LTE specification or configured by the RRC (Radio Resource Control) signaling. FIG. 5 shows the schematic diagram of an example in which the preset time window x is the sliding window in one embodiment of the present disclosure. Specifically, the length of the preset time window may be the fixed length x, while x being sliding change over the entire time axis, and for the base station, after the end of each time window of length x, the first transmission beam for transmitting downlink information is re-updated by the first transmission unit 820. Correspondingly, the UE may also judge the first transmission beam available to the base station according to the predetermined rule after the end of each sliding time window x.

In the foregoing embodiment, the selection of the first transmission beam of the base station by the first transmission unit 820 may follow the plurality of predetermined rules. For example, the first transmission beam of the base station may be selected according to the parameter indicating a channel state in the CSI feedback for the transmission beams of the base station. Alternatively, the parameter indicating the channel state may be the CQI (Channel Quality Indicator). Specifically, the method for determining the first transmission beam of the base station may include: selecting from the plurality of transmission beams of the base station, within the preset time window, the beam with a highest CQI as the first transmission beam; selecting, within the preset time window, the beam with the highest average CQI as the first transmission beam when the plurality of transmission beams of the base station have multiple CSI feedback and a plurality of CQI values are obtained; selecting from the plurality of transmission beams of the base station, within the preset time window, the beam whose CQI is greater than a predetermined threshold or a threshold configured by RRC and whose corresponding CSI feedback time is closest (that is, closest to the end point of the preset time window), as the first transmission beam; selecting, within the preset time window, the beam whose CQI is greater than the predetermined threshold for over a reference number of times and whose corresponding CSI feedback time is closest to the end point of the preset time window, or the beam whose average CQI is greater than the predetermined threshold and whose corresponding CSI feedback time is closest to the end point of the preset time window, as the first transmission beam, when the plurality of transmission beams of the base station have the plurality of CSI feedback. Herein, once the beam selection rule is determined, both the base station side and the UE side will follow the same rule to determine the transmission beam of the base station. For example, in the embodiment shown in FIG. 4, in the time window x, for the transmission beam a of the base station, the CQI value of the CSI feedback of the UE is 10; for the transmission beam b, the CQI value fed back by the UE is 13; for the transmission beam c, the CQI value fed back by the UE is 16; then again for the transmission beam a, the CQI value fed back by the UE is 11. At the base station side, after the end of the time window of length x, the first transmission beam available to the base station may be selected by the first transmission unit 820 according to the predetermined rule; while at the UE side, the first transmission beam available to the base station is determined after the preset delay period y following the preset time window of length x. In this embodiment, when the predetermined rule is to select the transmission beam with the highest CQI value, both the first transmission unit 820 at the base station side and the UE side will follow this rule to select the transmission beam c of the base station as the first transmission beam, and the UE side will receive, after having selected the transmission beam c as the first transmission beam of the base station, through the first reception beam 3 corresponding to the transmission beam c, the downlink information transmitted by the base station through the first transmission beam c. When the predetermined rule is to select the beam whose CQI is greater than the predetermined threshold (for example, 9) and whose corresponding CSI feedback time is closest, both the first transmission unit 820 at the base station side and the UE side will select the transmission beam a as the first transmission beam, and the UE side will receive, through the first transmission beam 1 corresponding to the transmission beam a, the downlink information transmitted by the base station.

In one embodiment of the present disclosure, the downlink information transmitted by the first transmission unit 820 at the base station side may be the DCI transmitted through the physical downlink control channel (PDCCH). Moreover, in the embodiment of the present disclosure, when it is determined that the base station carries out PDCCH transmission through the first transmission beam, the first transmission unit 820 at the base station may have the following two options for a transmission mode of a physical downlink shared channel (PDSCH): 1) carrying out the PDSCH transmission through the above first transmission beam; 2) indicating the transmission beam for PDSCH transmission by information that indicates beams included in the DCI transmitted by the first transmission beam, and transmitting the downlink data information through the determined beam. Correspondingly, the UE also needs to separately determine the transmission beams of the base station for PDSCH transmission for the above two modes of the base station, and select the preferred reception beam corresponding thereto to receive the downlink data information. The transmission beam may be a CSI-RS based beam or an SS block based beam. The information that indicates a beam in the PDCCH beam in a RRC configuration signaling used for configuring relations of a beam-search space time-frequency resources related to PDCCH beam sweeping, or in the DCI, may include one or more of beam information (beam-index), channel state information reference signal port (CSI-RS port), channel state information reference signal configuration (CSI-RS configuration) or CSI-RS index, beam reference signal configuration, codebook, code word, precoding information indication, spatial parameters or spatial relation information, and Synchronization Signal (SS) block index.

The base station in the communication system provided according to the embodiment of the present disclosure can enable the user equipment to determine the transmission beam of the base station utilizing information interaction with the base station, and select, via its determined transmission beam of base station, the corresponding reception beam to receive the downlink control information and the downlink data information transmitted by the base station, thereby improving transmission quality of the information in communication network.

Second Embodiment

Hereinafter, a demodulation method of downlink transmission according to a second embodiment of the present disclosure, in which a base station has a plurality of transmission beams, will be described.

Figure 9:
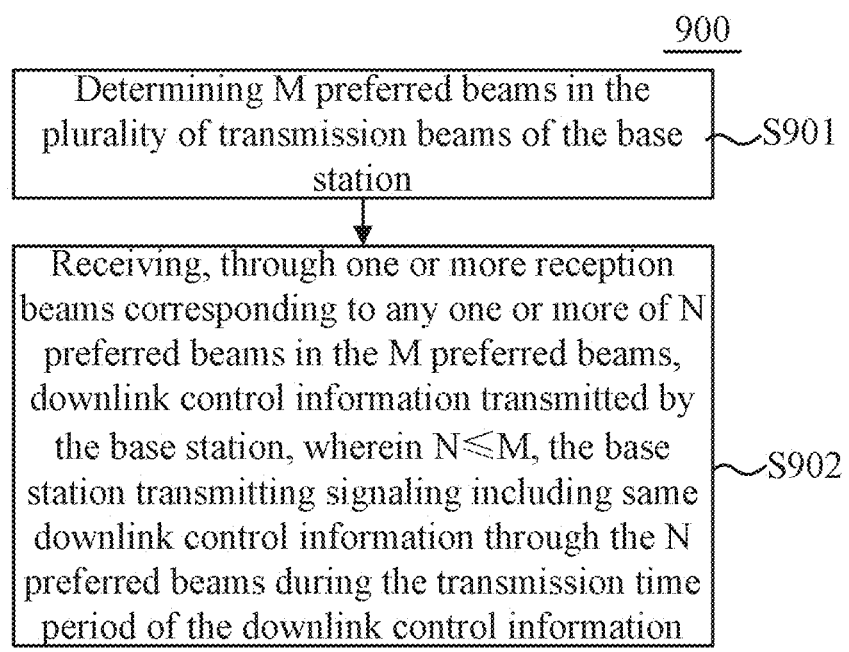
FIG. 9 shows a flowchart of a beam determination method performed by a user equipment according to a second embodiment of the present disclosure.

FIG. 9 shows the demodulation method of downlink transmission performed by a UE according to the second embodiment of the present disclosure. Through this method, the UE may determine a preset number N of preferred beams among M preferred beams in a plurality of transmission beams of the base station as well as reception beams of the UE corresponding to the preferred beams, and receive, with any one or more reception beams, downlink control information transmitted by the base station.

As shown in FIG. 9, in step S901, the M preferred beams in the plurality of transmission beams of the base station are determined. Specifically, before the downlink data transmission, the base station side and the UE side have jointly determined the M beams by using various methods, as beams that the base station may select when dynamically scheduling the UE. Wherein, both the UE side and the base station side may select M preferred beams from the plurality of transmission beams of the base station through a predetermined rule, and the selection basis may be according to previous channel state information or respective channel parameter values, or the like. When the M preferred beams are determined by the UE, the UE may transmit information of the M preferred beams to the base station; and when the M preferred beams are determined by the base station, the base station may also transmit the information of the preferred beams to the UE. For example, as shown in FIG. 4 of the embodiment described above, the three transmission beams a, b and c at the base station side are the preferred beams mentioned herein. For the M preferred beams, the base station may configure the users to carry out feedback, and then the UEs may report to the base station the channel state parameter information such as their corresponding CSI or the like.

In step S902, the UE receives, through one or more reception beams corresponding to any one or more of N preferred beams in the M preferred beams, the downlink control information transmitted by the base station, wherein N≤M, and the base station transmits signaling including the same downlink control information through the N preferred beams during the transmission time period of the downlink control information.

The UE and the base station may also select again from the M preferred beams of the base station transmission beams according to a preset or configured beam configuration or the number of beams. For example, the UE may further select N beams (N≤M) from the M preferred beams, so that the base station transmits the downlink control information through the N beams. N is the maximum number of repeated transmissions of the downlink control information transmitted on different beams. The configuration of the preset given number of N or the N beams herein may be defined by a LTE specification, or may be notified by broadcast information, for example, a master information block (MIB) or a system information block (SIB), or configured by a RRC signal. In the embodiment of the present invention, the base station will transmit a signaling including the downlink control information with the N preferred beams after learning the N preferred beams in the M preferred beams. Wherein, the downlink control information contents transmitted by the base station through each of the N preferred beams are all the same. Therefore, at the UE side, the downlink control information transmitted by the base station may be received through the reception beams corresponding to any one or more of the N preferred beams. It may be known according to the transmitting manner in which the base station transmits the downlink control information in the embodiment of the present disclosure, the same downlink control information transmitted by the base station may be obtained regardless of the corresponding reception beam through which the UE receives.

Certainly, in one embodiment of the present disclosure, the base station may also transmit signaling including the same downlink control information in the M preferred beams, that is, a case where N=M. At this time, the UE and the base station do not need to select again in the M preferred beams, but directly carry out information transmission according to the determined M preferred beams. Correspondingly, the UE may receive the downlink control information through the reception beams corresponding to one or more of the M preferred beams, and the UE may receive the same downlink control information for each corresponding reception beam.

In the embodiment of the present disclosure, transmission of the signaling including the downlink control information transmitted by the base station side on different beams may be multiplexed according to a manner of code division multiplexing (CDM), time division multiplexing (TDM), or frequency division multiplexing (FDM), so that the signaling is transmitted in the manner of code division multiplexing, time division multiplexing or frequency division multiplexing on different beams at the base station side. Correspondingly, the UE needs to carry out searching and information receiving in the search space with different beam sweeping patterns. The beam sweeping pattern herein may be preset by standard or defined by broadcast information or RRC or the like.

Figure 10:
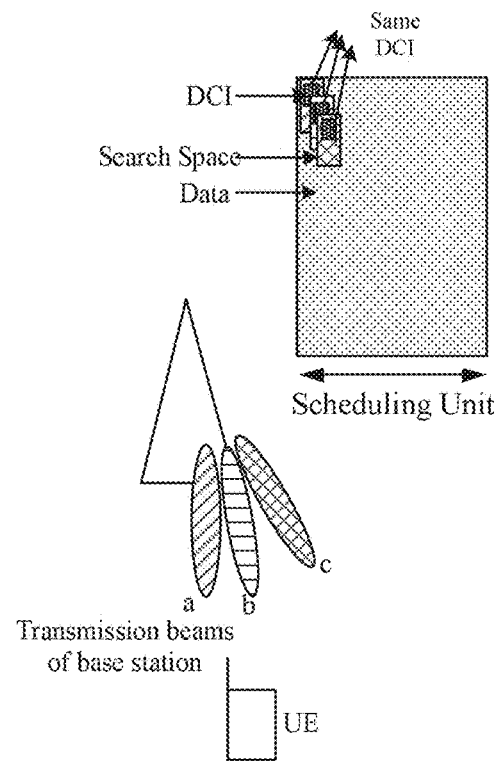
FIG. 10 shows an exemplary diagram of search space CDM beam sweeping in a second embodiment of the present disclosure.

Specifically, in a first implementation of the embodiment of the disclosure, the beam sweeping pattern is a CDM beam sweeping. FIG. 10 shows an exemplary diagram of search space CDM beam sweeping in the embodiment of the present disclosure. As shown in FIG. 10, in one scheduling unit, a horizontal axis represents time and a vertical axis represents frequency. At this time, search spaces of three preferred transmission beams a, b, and c of the base station are on the same time/frequency resources, and the RRC configures a plurality of beam-search space time/frequency resources related to PDCCH beam sweeping. Wherein, the search space corresponding to each beam will all include the same DCI information. That is to say, the UE will acquire the DCI information regardless of searching in the search space corresponding to a, b or c, and the UE may learn the transmission beams of the PDSCH through the information that indicates beams in the DCI by further decoding the DCI.

Figure 11:
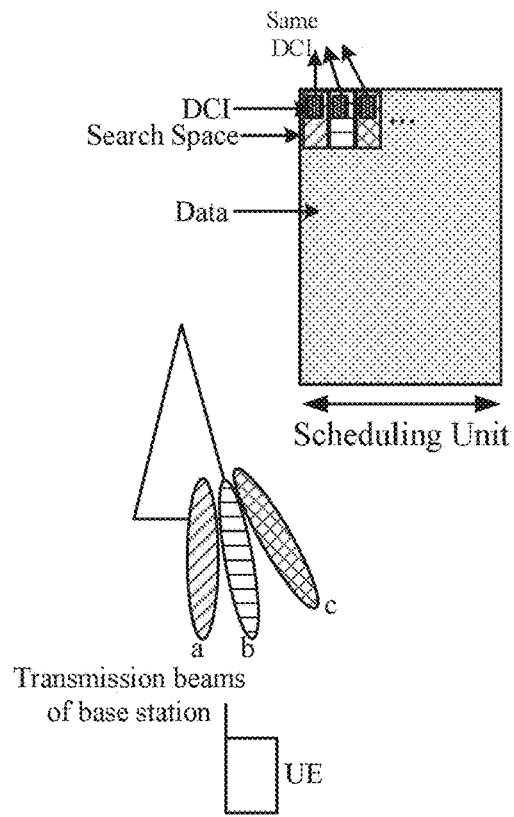
FIG. 11 shows an exemplary diagram of search space TDM beam sweeping in a second embodiment of the present disclosure.

In a second implementation of the embodiment of the present disclosure, the beam sweeping pattern is a TDM beam sweeping. FIG. 11 shows an exemplary diagram of search space TDM beam sweeping in the embodiment of the present disclosure. As shown in FIG. 11, in one scheduling unit, a horizontal axis represents time and a vertical axis represents frequency. At this time, the search spaces of the three preferred transmission beams a, b, and c of the base station are on different time resources, and the RRC configures a beam-search space time/frequency resource related to the PDCCH beam sweeping. Wherein, the search space corresponding to each beam will all include the same DCI information. That is to say, the UE will acquire the DCI information regardless of searching in the search space corresponding to a, b or c, and the UE may learn the transmission beams of the PDSCH through the information that indicates beams in the DCI by further decoding the DCI.

Figure 12:
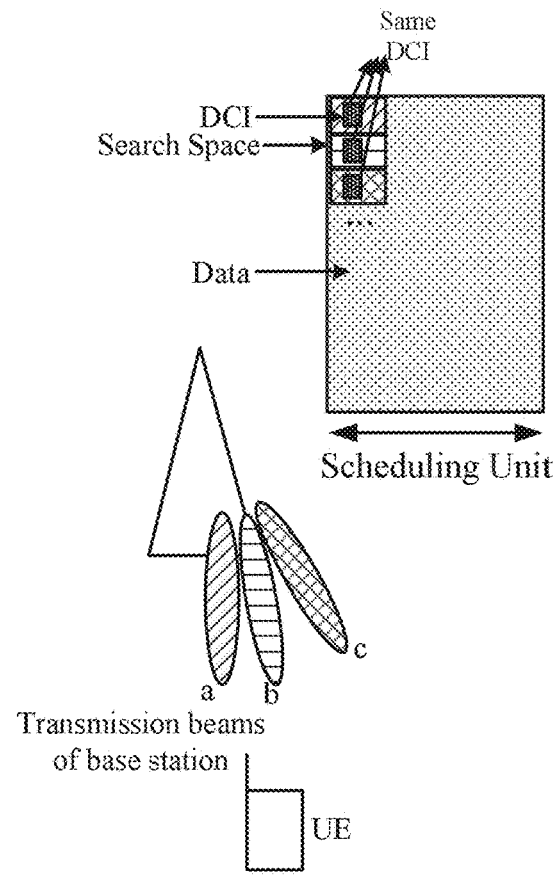
FIG. 12 shows an exemplary diagram of search space FDM beam sweeping in a second embodiment of the present disclosure.

In a third implementation of the embodiment of the disclosure, the beam sweeping pattern is a FDM beam sweeping. FIG. 12 shows an exemplary diagram of search space FDM beam sweeping in the embodiment of the present disclosure. As shown in FIG. 12, in one scheduling unit, a horizontal axis represents time and a vertical axis represents frequency. At this time, the search spaces of the three preferred transmission beams a, b, and c of the base station are on different frequency resources, and the RRC configures a beam-search space time/frequency resource related to the PDCCH beam sweeping. Wherein, the search space corresponding to each beam will all include the same DCI information. That is to say, the UE will acquire the DCI information regardless of searching in the search space corresponding to a, b or c, and the UE may learn the transmission beams of the PDSCH through the information that indicates beams in the DCI by further decoding the DCI.

The transmission beam may be a CSI-RS based beam or an SS block based beam. The information that indicates a beam in the PDCCH beam in a RRC configuration signaling used for configuring relations of a beam-search space time-frequency resources related to PDCCH beam sweeping, or in the DCI, may include one or more of beam information (beam-index), channel state information reference signal port (CSI-RS port), channel state information reference signal configuration (CSI-RS configuration) or CSI-RS index, beam reference signal configuration, codebook, code word, precoding information indication, spatial parameters or spatial relation information, and Synchronization Signal (SS) block index.

In one embodiment of the present disclosure, the base station may inform the UE the transmission beam of the base station for transmitting downlink data information by the information that indicates beams included in the downlink control information. That is, the base station includes information for indicating the transmission beam of the PDSCH in the DCI, and transmits the DCI to the UE through all the N preferred beams. At the UE side, by decoding the received DCI content, the transmission beam of the PDSCH transmission adopted by the base station may be learned.

The demodulation method for downlink transmission performed in the communication system provided according to the embodiment of the present disclosure can enable the user equipment to utilize the information interaction between the user equipment and the base station to determine the preferred beams in the plurality of transmission beams of the base station and the reception beams of the UE corresponding to the preferred beams, and utilize any one or more reception beams to receive the downlink control information transmitted by the base station, thereby improving the transmission quality of the information in the communication network.

Hereinafter, a demodulation method of downlink transmission performed by the base station according to the second embodiment of the present disclosure will be described. Since most of the operations of the method have been described above in describing the demodulation method of downlink transmission performed by the UE, the description of the same content is omitted herein to avoid redundancy.

Figure 13:
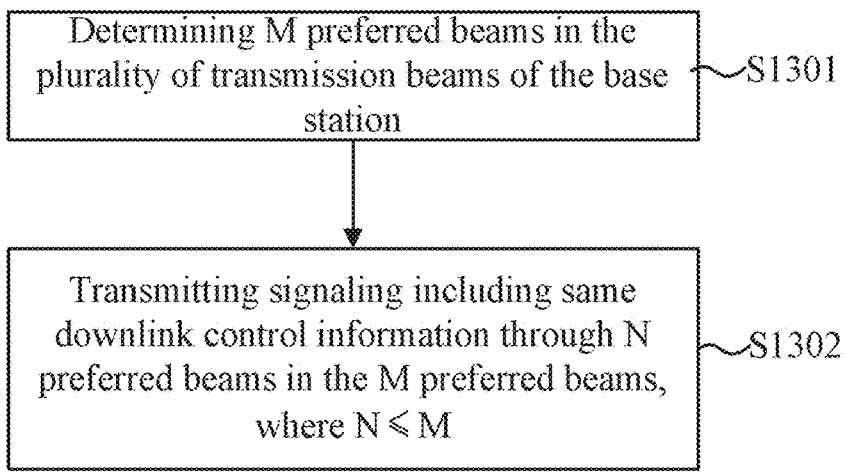
FIG. 13 shows a flowchart of a beam determination method performed by a base station according to a second embodiment of the present disclosure.

FIG. 13 shows the demodulation method of downlink transmission performed by the base station according to the second embodiment of the present disclosure. Through this method, the base station may learn the preferred beam used by the base station to transmit the downlink control information, and transmit the downlink information through all the preferred transmission beams.

As shown in FIG. 13, in step S1301, M preferred beams in a plurality of transmission beams of the base station are determined. Specifically, before the downlink data transmission, the base station side and the UE side have jointly determined the M beams by using various methods, as beams that the base station may select when dynamically scheduling the UE. Wherein, both the UE side and the base station side may select M preferred beams from the plurality of transmission beams of the base station through a predetermined rule, and the selection basis may be according to previous channel state information or respective channel parameter values, or the like. When the M preferred beams are determined by the UE, the UE may transmit information of the M preferred beams to the base station; and when the M preferred beams are determined by the base station, the base station may also transmit the information of the preferred beams to the UE. For example, as shown in FIG. 4 of the embodiment described above, the three transmission beams a, b and c at the base station side are the preferred beams mentioned herein. For the M preferred beams, the base station may configure the users to carry out feedback, and then the base station may receive reported from the UE the channel state parameter information such as their corresponding CSI or the like.

In step S1302, the base station may transmit signaling including the same downlink control information through N preferred beams in the M preferred beams, where N 1\4. Wherein, both the UE and the base station may select again from the M preferred beams transmitted by the base station according to the preset number of beams. For example, the UE may further select N beams (NM) from the M preferred beams according to the preset or configured beam configuration or the number of beams, so that the base station transmits the downlink control information through the N beams. N is the maximum number of repeated transmissions of the downlink control information transmitted on different beams. The configuration of the preset given number of N or the N beams herein may be defined by the LTE specifications, or may be notified by broadcast information, for example, the MIB or the SIB, or configured by the RRC signal. In the embodiment of the present invention, the base station will transmit a signaling including the downlink control information with the N preferred beams after learning the N preferred beams in the M preferred beams. Wherein, the downlink control information contents transmitted by the base station through each of the N preferred beams are all the same. Correspondingly, at the UE side, the downlink control information transmitted by the base station may be received through the reception beams corresponding to any one or more of the N preferred beams. It may be known according to the transmitting manner in which the base station transmits the downlink control information in the embodiment of the present disclosure, the same downlink control information transmitted by the base station may be obtained regardless of the corresponding reception beam through which the UE receives.

Certainly, in one embodiment of the present disclosure, the base station may also transmit signaling including the same downlink control information in the M preferred beams, that is, a case where N=M. At this time, the UE and the base station do not need to select again in the M preferred beams, but directly carry out information transmission according to the determined M preferred beams. Correspondingly, the UE may receive the downlink control information through the reception beams corresponding to one or more of the M preferred beams, and the UE may receive the same downlink control information for each corresponding reception beam.

In the embodiment of the present disclosure, transmission of the signaling including the downlink control information transmitted by the base station side on different beams may be multiplexed according to a manner of code division multiplexing (CDM), time division multiplexing (TDM), or frequency division multiplexing (FDM), so that the signaling is transmitted in the manner of code division multiplexing, time division multiplexing or frequency division multiplexing on different beams at the base station side. Correspondingly, the UE needs to carry out searching and information receiving in the search space with different beam sweeping patterns. The beam sweeping pattern herein may be preset by standard or defined by broadcast information or RRC or the like.

Specifically, in the first implementation of the embodiment of the disclosure, the beam sweeping pattern is the CDM beam sweeping. FIG. 10 shows an exemplary diagram of search space CDM beam sweeping in the embodiment of the present disclosure. As shown in FIG. 10, in one scheduling unit, a horizontal axis represents time and a vertical axis represents frequency. At this time, search spaces of three preferred transmission beams a, b, and c of the base station are on the same time/frequency resources, and the RRC configures the plurality of beam-search space time/frequency resources related to PDCCH beam sweeping. Wherein, the search space corresponding to each beam will all include the same DCI information. That is to say, the UE will acquire the DCI information regardless of searching in the search space corresponding to a, b or c, and the UE may learn the transmission beams of the PDSCH through the information that indicates beams in the DCI by further decoding the DCI.

In the second implementation of the embodiment of the present disclosure, the beam sweeping pattern is the TDM beam sweeping. FIG. 11 shows an exemplary diagram of search space TDM beam sweeping in the embodiment of the present disclosure. As shown in FIG. 11, in one scheduling unit, a horizontal axis represents time and a vertical axis represents frequency. At this time, the search spaces of the three preferred transmission beams a, b, and c of the base station are on different time resources, and the RRC configures the beam-search space time/frequency resource related to the PDCCH beam sweeping. Wherein, the search space corresponding to each beam will all include the same DCI information. That is to say, the UE will acquire the DCI information regardless of searching in the search space corresponding to a, b or c, and the UE may learn the transmission beams of the PDSCH through the information that indicates beams in the DCI by further decoding the DCI.

In the third implementation of the embodiment of the disclosure, the beam sweeping pattern is the FDM beam sweeping. FIG. 12 shows an exemplary diagram of search space FDM beam sweeping in the embodiment of the present disclosure. As shown in FIG. 12, in one scheduling unit, a horizontal axis represents time and a vertical axis represents frequency. At this time, the search spaces of the three preferred transmission beams a, b, and c of the base station are on different frequency resources, and the RRC configures the beam-search space time/frequency resource related to the PDCCH beam sweeping. Wherein, the search space corresponding to each beam will all include the same DCI information. That is to say, the UE will acquire the DCI information regardless of searching in the search space corresponding to a, b or c, and the UE may learn the transmission beams of the PDSCH through the information that indicates beams in the DCI by further decoding the DCI.

The transmission beam may be a CSI-RS based beam or an SS block based beam. The information that indicates a beam in the PDCCH beam in a RRC configuration signaling used for configuring relations of a beam-search space time-frequency resources related to PDCCH beam sweeping, or in the DCI, may include one or more of beam information (beam-index), channel state information reference signal port (CSI-RS port), channel state information reference signal configuration (CSI-RS configuration) or CSI-RS index, beam reference signal configuration, codebook, code word, precoding information indication, spatial parameters or spatial relation information, and Synchronization Signal (SS) block index.

In one embodiment of the present disclosure, the base station may inform the UE the transmission beam of the base station for transmitting downlink data information by the information that indicates beams included in the downlink control information. That is, the base station includes information for indicating the transmission beam of the PDSCH in the DCI, and transmits the DCI to the UE through all the N preferred beams. At the UE side, by decoding the received DCI content, the transmission beam of the PDSCH transmission adopted by the base station may be learned.

The demodulation method for downlink transmission performed in the communication system provided according to the embodiment of the present disclosure can enable the user equipment to utilize the information interaction between the user equipment and the base station to determine the preferred beams in the plurality of transmission beams of the base station and the reception beams of the UE corresponding to the preferred beams, and utilize any one or more reception beams to receive the downlink control information transmitted by the base station, thereby improving the transmission quality of the information in the communication network.

Hereinafter, the UE according to the second embodiment of the present disclosure will be described with reference to FIG. 14. The UE may perform the demodulation method for the downlink transmission described above. Since the operation of the UE is substantially the same as respective steps of the demodulation method for the downlink transmission described above, only a brief description thereof is made herein, and a repeated description of the same content is omitted.

Figure 14:
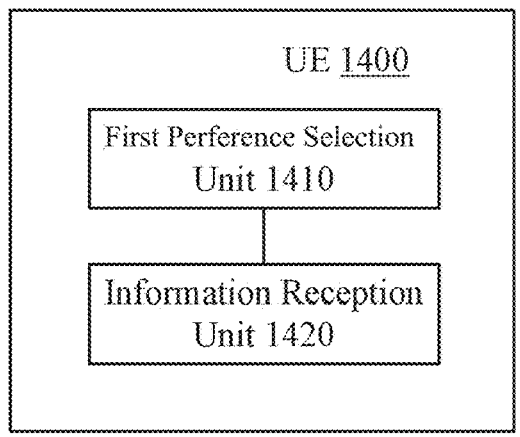
FIG. 14 shows a block diagram of a structure of a UE according to a second embodiment of the present disclosure.

As shown in FIG. 14, a UE 1400 includes a first preference selection unit 1410 and an information reception unit 1420. It needs to be appreciated that FIG. 14 only shows means related to the embodiment of the present disclosure, while other means are omitted. But this is merely illustrative, and the UE 1400 may include other means as needed.

The first preference selection unit 1410 is configured to determine M preferred beams in a plurality of transmission beams of the base station. Specifically, before the downlink data transmission, the base station side and the UE side have jointly determined the M beams by using various methods, as beams that the base station may select when dynamically scheduling the UE. Wherein, both the UE side and the base station side may select M preferred beams from the plurality of transmission beams of the base station through a predetermined rule, and the selection basis may be according to previous channel state information or respective channel parameter values, or the like. When the M preferred beams are determined by the first preference selection unit 1410 of the UE, the UE may transmit information of the M preferred beams to the base station; and when the M preferred beams are determined by the base station, the base station may also transmit the information of the preferred beams to the UE. For example, as shown in FIG. 4 of the embodiment described above, the three transmission beams a, b and c at the base station side are the preferred beams mentioned herein. Optically, for the M preferred beams, the base station may configure the users to carry out feedback, and then the UEs may report to the base station the channel state parameter information such as their corresponding CSI or the like.

The information reception unit 1420 is configured to receive, through one or more reception beams corresponding to any one or more of N preferred beams in the M preferred beams, the downlink control information transmitted by the base station, wherein N the base station transmitting signaling including the same downlink control information through the N preferred beams during the transmission time period of the downlink control information.

The UE and the base station may also select again from the M preferred beams of the base station transmission beams according to a preset or configured beam configuration or the number of beams. For example, the information reception unit 1420 of the UE may further select N beams (N≤M) from the M preferred beams, so that the base station transmits the downlink control information through the N beams. N is the maximum number of repeated transmissions of the downlink control information transmitted on different beams. The configuration of the preset given number of N or the N beams herein may be defined by the LTE specification, or may be notified by broadcast information, for example, the MIB or the SIB, or configured by the RRC signal. In the embodiment of the present invention, the base station will transmit a signaling including the downlink control information with the N preferred beams after learning the N preferred beams in the M preferred beams. Wherein, the downlink control information contents transmitted by the base station through each of the N preferred beams are all the same. Therefore, at the UE side, the downlink control information transmitted by the base station may be received by the information reception unit 1420 through the reception beams corresponding to any one or more of the N preferred beams. It may be known according to the transmitting manner in which the base station transmits the downlink control information in the embodiment of the present disclosure, the same downlink control information transmitted by the base station may be obtained regardless of the corresponding reception beam through which the information reception unit 1420 of the UE receives.

Certainly, in one embodiment of the present disclosure, the base station may also transmit signaling including the same downlink control information in the M preferred beams, that is, a case where N=M. At this time, the UE and the base station do not need to select again in the M preferred beams, but directly carry out information transmission according to the determined M preferred beams. Correspondingly, the information reception unit 1420 of the UE may receive the downlink control information through the reception beams corresponding to one or more of the M preferred beams, and the UE may receive the same downlink control information for each corresponding reception beam.

In the embodiment of the present disclosure, transmission of the signaling including the downlink control information transmitted by the base station side on different beams may be multiplexed according to a manner of code division multiplexing (CDM), time division multiplexing (TDM), or frequency division multiplexing (FDM), so that the signaling is transmitted in the manner of code division multiplexing, time division multiplexing or frequency division multiplexing on different beams at the base station side. Correspondingly, the information reception unit 1420 of the UE needs to carry out searching and information receiving in the search space with different beam sweeping patterns. The beam sweeping pattern herein may be preset by standard or defined by broadcast information or RRC or the like.

Specifically, in the first implementation of the embodiment of the disclosure, the beam sweeping pattern is the CDM beam sweeping. FIG. 10 shows an exemplary diagram of search space CDM beam sweeping in the embodiment of the present disclosure. As shown in FIG. 10, in one scheduling unit, a horizontal axis represents time and a vertical axis represents frequency. At this time, search spaces of three preferred transmission beams a, b, and c of the base station are on the same time/frequency resources, and the RRC configures the plurality of beam-search space time/frequency resources related to PDCCH beam sweeping. Wherein, the search space corresponding to each beam will all include the same DCI information. That is to say, the information reception unit 1420 of the UE will acquire the DCI information regardless of searching in the search space corresponding to a, b or c, and the UE may learn the transmission beams of the PDSCH through the information that indicates beams in the DCI by further decoding the DCI.

In the second implementation of the embodiment of the present disclosure, the beam sweeping pattern is the TDM beam sweeping. FIG. 11 shows an exemplary diagram of search space TDM beam sweeping in the embodiment of the present disclosure. As shown in FIG. 11, in one scheduling unit, a horizontal axis represents time and a vertical axis represents frequency. At this time, the search spaces of the three preferred transmission beams a, b, and c of the base station are on different time resources, and the RRC configures the beam-search space time/frequency resource related to the PDCCH beam sweeping. Wherein, the search space corresponding to each beam will all include the same DCI information. That is to say, the information reception unit 1420 of the UE will acquire the DCI information regardless of searching in the search space corresponding to a, b or c, and the UE may learn the transmission beams of the PDSCH through the information that indicates beams in the DCI by further decoding the DCI.

In the third implementation of the embodiment of the disclosure, the beam sweeping pattern is the FDM beam sweeping. FIG. 12 shows an exemplary diagram of search space FDM beam sweeping in the embodiment of the present disclosure. As shown in FIG. 12, in one scheduling unit, a horizontal axis represents time and a vertical axis represents frequency. At this time, the search spaces of the three preferred transmission beams a, b, and c of the base station are on different frequency resources, and the RRC configures the beam-search space time/frequency resource related to the PDCCH beam sweeping. Wherein, the search space corresponding to each beam will all include the same DCI information. That is to say, the information reception unit 1420 of the UE will acquire the DCI information regardless of searching in the search space corresponding to a, b or c, and the UE may learn the transmission beams of the PDSCH through the information that indicates beams in the DCI by further decoding the DCI.

The transmission beam may be a CSI-RS based beam or an SS block based beam. The information that indicates a beam in the PDCCH beam in a RRC configuration signaling used for configuring relations of a beam-search space time-frequency resources related to PDCCH beam sweeping, or in the DCI, may include one or more of beam information (beam-index), channel state information reference signal port (CSI-RS port), channel state information reference signal configuration (CSI-RS configuration) or CSI-RS index, beam reference signal configuration, codebook, code word, precoding information indication, spatial parameters or spatial relation information, and Synchronization Signal (SS) block index.

In one embodiment of the present disclosure, the base station may inform the UE the transmission beam of the base station for transmitting downlink data information by the information that indicates beams included in the downlink control information. That is, the base station includes information for indicating the transmission beam of the PDSCH in the DCI, and transmits the DCI to the UE through all the N preferred beams. At the UE side, by decoding the received DCI content, the transmission beam of the PDSCH transmission adopted by the base station may be learned by the information reception unit 1420.

The UE in the communication system provided according to the embodiment of the present disclosure can enable the user equipment to utilize the information interaction between the user equipment and the base station to determine the preferred beams in the plurality of transmission beams of the base station and the reception beams of the UE corresponding to the preferred beams, and utilize any one or more reception beams to receive the downlink control information transmitted by the base station, thereby improving the transmission quality of the information in the communication network.

Hereinafter, the base station according to the second embodiment of the present disclosure will be described with reference to FIG. 15. The base station may perform the demodulation method for the downlink transmission described above. Since the operation of the base station is substantially the same as respective steps of the demodulation method for the downlink transmission described above, only a brief description thereof is made herein, and a repeated description of the same content is omitted.

Figure 15:
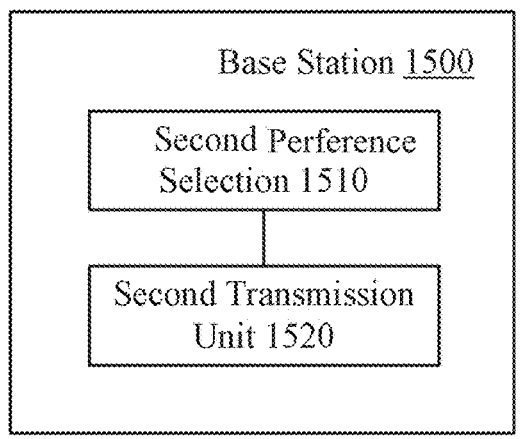
FIG. 15 shows a block diagram of a structure of a base station according to a second embodiment of the present disclosure.

As shown in FIG. 15, a base station 1500 includes a second preference selection unit 1510 and a second transmission unit 1520. It needs to be appreciated that FIG. 15 only shows means related to embodiments of the present disclosure, while other means are omitted, but this is merely illustrative, and base station 1500 may include other means as needed.

The second preference selection unit 1510 determines M preferred beams in a plurality of transmission beams of the base station. Specifically, before the downlink data transmission, the base station side and the UE side have jointly determined the M beams by using various methods, as beams that the base station may select when dynamically scheduling the UE. Wherein, both the UE side and the base station side may select M preferred beams from the plurality of transmission beams of the base station through a predetermined rule, and the selection basis may be according to previous channel state information or respective channel parameter values, or the like. When the M preferred beams are determined by the UE, the UE may transmit information of the M preferred beams to the base station; and when the M preferred beams are determined by the base station, the second preference selection unit 1510 of the base station may also transmit the information of the preferred beams to the UE. For example, as shown in FIG. 4 of the embodiment described above, the three transmission beams a, b and c at the base station side are the preferred beams mentioned herein. Optically, for the M preferred beams, the base station may configure the users to carry out feedback, and then the base station may receive reported from the UE the channel state parameter information such as their corresponding CSI or the like.

The second transmission unit 1520 transmits signaling including the same downlink control information through N preferred beams in the M preferred beams, where $N \leq M$. Wherein, both the UE and the base station may select again from the M preferred beams transmitted by the base station according to the preset or configured beam configuration or the number of beams. For example, the UE may further select N beams (N M) from the M preferred beams, so that the base station transmits the downlink control information through the N beams. N is the maximum number of repeated transmissions of the downlink control information transmitted on different beams. The configuration of the preset given number of N or the N beams herein may be defined by the LTE specifications, or may be notified by broadcast information, for example, the MIB or the SIB, or configured by the RRC signal. In the embodiment of the present invention, the second transmission unit 1520 of the base station will transmit a signaling including the downlink control information with the N preferred beams after learning the N preferred beams in the M preferred beams. Wherein, the downlink control information contents transmitted by the second transmission unit 1520 through each of the N preferred beams are all the same. Correspondingly, at the UE side, the downlink control information transmitted by the base station may be received through the reception beams corresponding to any one or more of the N preferred beams. It may be known according to the transmitting manner in which the base station transmits the downlink control information in the embodiment of the present disclosure, the same downlink control information transmitted by the base station may be obtained regardless of the corresponding reception beam through which the UE receives.

Certainly, in one embodiment of the present disclosure, the second transmission unit 1520 may also transmit signaling including the same downlink control information in the M preferred beams, that is, a case where N=M. At this time, the UE and the base station do not need to select again in the M preferred beams, but directly carry out information transmission according to the determined M preferred beams. Correspondingly, the UE may receive the downlink control information through the reception beams corresponding to one or more of the M preferred beams, and the UE may receive the same downlink control information for each corresponding reception beam.

In the embodiment of the present disclosure, transmission of the signaling including the downlink control information transmitted by the second transmission unit 1520 of the base station side on different beams may be multiplexed according to a manner of code division multiplexing (CDM), time division multiplexing (TDM), or frequency division multiplexing (FDM), so that the signaling is transmitted in the manner of code division multiplexing, time division multiplexing or frequency division multiplexing on different beams at the base station side. Correspondingly, the UE needs to carry out searching and information receiving in the search space with different beam sweeping patterns. The beam sweeping pattern herein may be preset by standard or defined by broadcast information or RRC or the like.

Specifically, in the first implementation of the embodiment of the disclosure, the beam sweeping pattern is the CDM beam sweeping. FIG. 10 shows an exemplary diagram of search space CDM beam sweeping in the embodiment of the present disclosure. As shown in FIG. 10, in one scheduling unit, a horizontal axis represents time and a vertical axis represents frequency. At this time, search spaces of three preferred transmission beams a, b, and c of the base station are on the same time/frequency resources, and the RRC configures the plurality of beam-search space time/frequency resources related to PDCCH beam sweeping. Wherein, the search space corresponding to each beam will all include the same DCI information. That is to say, the UE will acquire the DCI information regardless of searching in the search space corresponding to a, b or c, and the UE may learn the transmission beams of the PDSCH through the information that indicates beams in the DCI by further decoding the DCI.

In the second implementation of the embodiment of the present disclosure, the beam sweeping pattern is the TDM beam sweeping. FIG. 11 shows an exemplary diagram of search space TDM beam sweeping in the embodiment of the present disclosure. As shown in FIG. 11, in one scheduling unit, a horizontal axis represents time and a vertical axis represents frequency. At this time, the search spaces of the three preferred transmission beams a, b, and c of the base station are on different time resources, and the RRC configures the beam-search space time/frequency resource related to the PDCCH beam sweeping. Wherein, the search space corresponding to each beam will all include the same DCI information. That is to say, the UE will acquire the DCI information regardless of searching in the search space corresponding to a, b or c, and the UE may learn the transmission beams of the PDSCH through the information that indicates beams in the DCI by further decoding the DCI.

In the third implementation of the embodiment of the disclosure, the beam sweeping pattern is the FDM beam sweeping. FIG. 12 shows an exemplary diagram of search space FDM beam sweeping in the embodiment of the present disclosure. As shown in FIG. 12, in one scheduling unit, a horizontal axis represents time and a vertical axis represents frequency. At this time, the search spaces of the three preferred transmission beams a, b, and c of the base station are on different frequency resources, and the RRC configures the beam-search space time/frequency resource related to the PDCCH beam sweeping. Wherein, the search space corresponding to each beam will all include the same DCI information. That is to say, the UE will acquire the DCI information regardless of searching in the search space corresponding to a, b or c, and the UE may learn the transmission beams of the PDSCH through the information that indicates beams in the DCI by further decoding the DCI.

Wherein, the transmission beam may be the CSI-RS based beam or the SS block based beam. The information that indicates beams in the RRC configuration signaling or in the DCI, being in the PDCCH beam and used for configuring relations of the beam-search space time-frequency resource related to PDCCH beam sweeping, may include one or more of beam information (beam-index), channel state information reference signal port (CSI-RS port), channel state information reference signal configuration (CSI-RS configuration), beam reference signal configuration, codebook, code word, precoding information indication and SS block index In one embodiment of the present disclosure, the second transmission unit 1520 may inform the UE the transmission beam of the base station for transmitting downlink data information by the information that indicates beams included in the downlink control information. That is, the base station includes information for indicating the transmission beam of the PDSCH in the DCI, and transmits the DCI to the UE through all the N preferred beams. At the UE side, by decoding the received DCI content, the transmission beam of the PDSCH transmission adopted by the base station may be learned.

The base station in the communication system provided according to the embodiment of the present disclosure can enable the user equipment to utilize the information interaction between the user equipment and the base station to determine the preferred beams in the plurality of transmission beams of the base station and the reception beams of the UE corresponding to the preferred beams, and utilize any one or more reception beams to receive the downlink control information transmitted by the base station, thereby improving the transmission quality of the information in the communication network.

Third Embodiment

Hereinafter, a demodulation method of downlink transmission according to the third embodiment of the present disclosure, in which a base station has a plurality of transmission beams, will be described.

Figure 16:
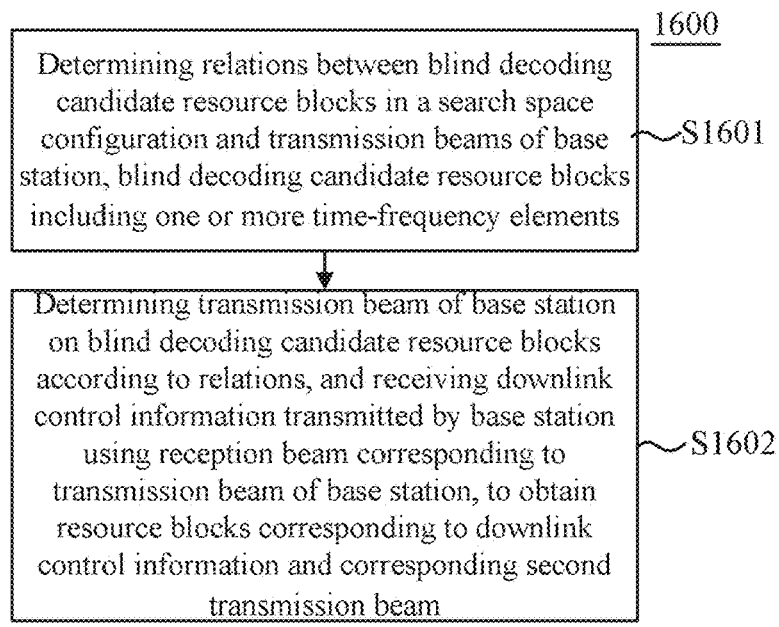
FIG. 16 shows a flowchart of a beam determination method performed by a user equipment according to a third embodiment of the present disclosure.

FIG. 16 shows the demodulation method of downlink transmission performed by a UE according to the third embodiment of the present disclosure. With this method, through the relations between candidate control resource blocks (for example, blind decoding candidate resource blocks) in a predetermined control information (control resource, for example, may be search space) and transmission beams of the base station, the UE searches in the search space by utilizing corresponding reception beams to receive downlink control information transmitted by the base station.

As shown in FIG. 16, in step S1601, the UE determines relations between candidate resource blocks of a blind decoding (BD) PDCCH in a control information configuration (control resource configuration, for example, may be a search space configuration) and the transmission beams of the base station, the blind decoding candidate resource blocks including one or more time-frequency elements. Specifically, the relations between the blind decoding candidate resource blocks in the search space configuration and the transmission beams of the base station may be configured by the base station and notified to the UE by broadcast information (for example, MIB or SIB), or RRC signal.

In step S1602, the UE determines the transmission beams of the base station on each blind decoding PDCCH candidate resource block according to the relations, and receives each blind decoding PDCCH candidate resource block using the reception beams corresponding to the transmission beams of the base station, to obtain resource blocks corresponding to the downlink control information and a corresponding second transmission beam. Specifically, after determining the preconfigured relations between the blind decoding candidate resource blocks in the search space configuration and the transmission beams of the base station, the base station may select the second transmission beam for transmitting downlink information, and transmit the downlink control information on the blind decoding candidate resource block corresponding to the transmission beam according to the relations. After learning the preconfigured relations, for each blind decoding candidate resource block, the UE may judge the corresponding transmission beam of the base station according to the relations, and search and attempt to receive information on the blind decoding candidate resource block with the reception beam corresponding to the transmission beam, so as to receive the downlink control information and its corresponding blind decoding candidate resource block and the corresponding second transmission beam of the base station. When the UE does not receive the downlink control information on one blind decoding candidate resource block, it means that the base station does not select the transmission beam corresponding to the blind decoding candidate resource block to transmit information; and when the UE receives the downlink control information on one blind decoding candidate resource block, it means that the base station transmits the downlink control information with its corresponding second transmission beam. Since the UE has determined the transmission beam of the base station corresponding to the blind decoding candidate resource block according to the foregoing relations and has selected the preferred second reception beam corresponding to the second transmission beam to receive the information, the method of the embodiment of the present invention may ensure the communication quality of the communication system.

Figure 17:
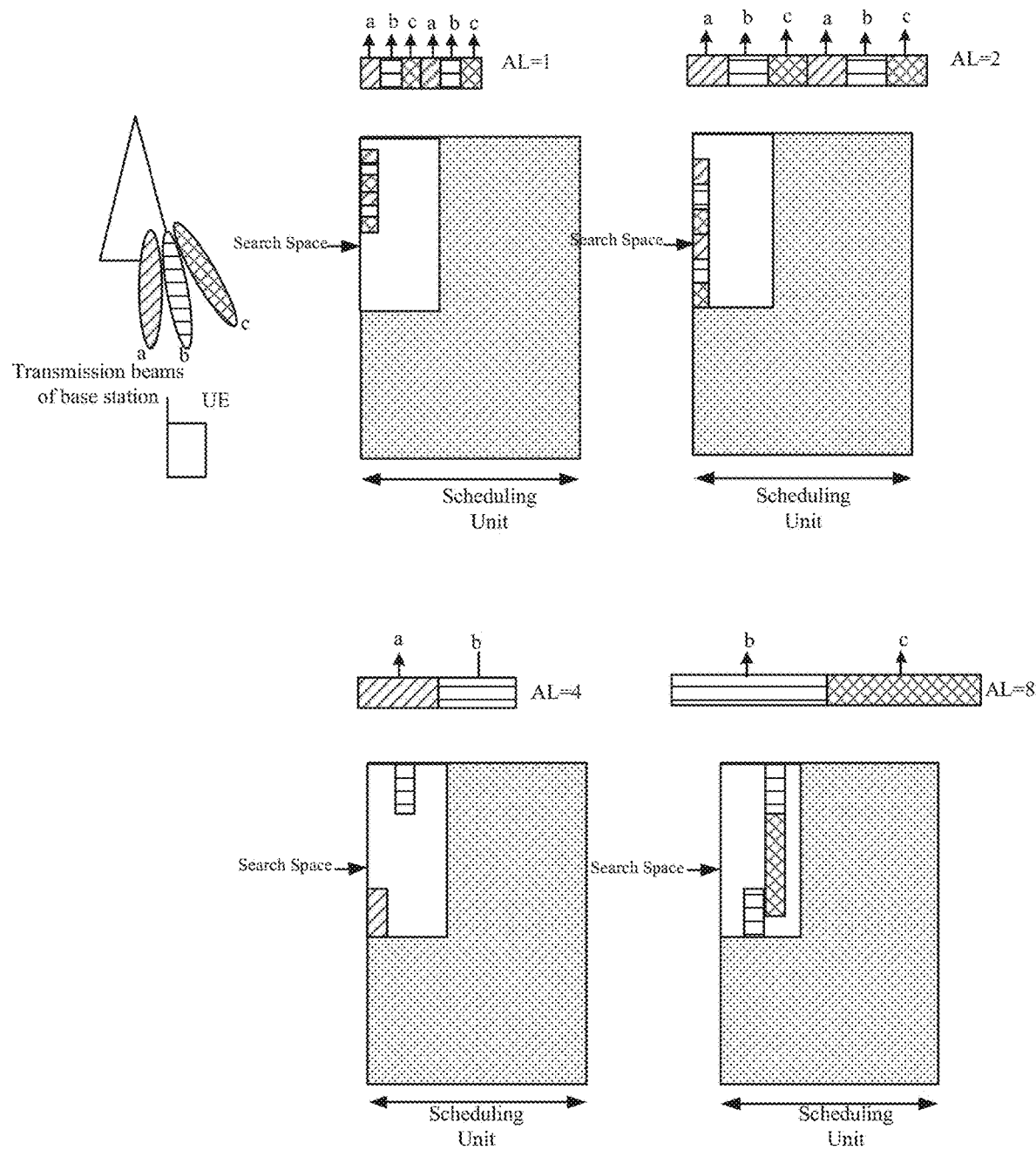
FIG. 17 shows a schematic diagram of a search space configuration of a blind decoding candidate resource block in a third embodiment of the present disclosure.

In one embodiment of the present disclosure, the blind decoding candidate resource blocks may have different aggregation levels (AL), and the blind decoding candidate resource blocks include different numbers of time-frequency elements at different aggregation levels. For example, there are four type aggregation levels in LTE, which are 1/2/4/8, respectively. In 5G the aggregation levels may be changed compared to the LTE. Certainly, the present invention is suitable for candidate resource blocks of the PDCCH of aggregation levels under any definition, and is also applicable to candidate resource blocks of the PDCCH that does not have the aggregation level. FIG. 17 shows a schematic diagram of a configuration of relations between the blind decoding candidate resource blocks and the transmission beams of the base station in the embodiment of the present disclosure. In a scheduling unit, the search space has different configurations corresponding to the aggregation levels AL=1, 2, 4, and 8. The candidate resource blocks may be arranged firstly by time domain resources and then by frequency domain resources, inside the PDCCH region, that is, the search space, or may be arranged firstly by the frequency domain resources and then by the time domain resources. Wherein, FIG. 17 is an example of first arranging the time domain resource and then the frequency domain resource. As shown in FIG. 17, there are three preferred transmission beams a, b, and c for the user in total at the base station side. When the aggregation level of the blind decoding candidate resource blocks is 1, the six candidate resource blocks may respectively correspond to the three transmission beams a, b, and c of the base station, and each candidate resource block may include one time-frequency element. When the aggregation level is 2, each candidate resource block is twice the candidate resource block with aggregation level 1, and each includes two time-frequency elements, and the six candidate resource blocks may also correspond to the three transmission beams a, b, and c of the base station, respectively. When the aggregation level is 4, each candidate resource block is four times of the candidate resource block with aggregation level 1, and each includes four time-frequency elements, and the two candidate resource blocks respectively correspond to the two transmission beams a and b of the base station. When the aggregation level is 8, each candidate resource block is eight times of the candidate resource block with aggregation level 1, and each includes eight time-frequency elements, and the two candidate resource blocks respectively correspond to the two transmission beams b and c of the base station. When transmitting the downlink control information, the base station may determine the resource block corresponding to the second transmission beam according to the search space configuration in FIG. 17 after determining the aggregation level and the second transmission beam for transmitting the downlink control information. For example, when the base station, for example, determines to transmit the downlink information with a certain transmission beam as the second transmission beam according to channel condition, and the aggregation level is x, it may transmit according to the blind decoding candidate resource block with aggregation level x corresponding to the second transmission beam in the search space configuration. Correspondingly, when the UE carries out beam sweeping on the search space, for different blind decoding candidate resource blocks with different aggregation levels and their corresponding transmission beams, different reception beams will be selected to sweep. That is, for the resource block on which the base station actually transmits a downlink control channel, the UE will select the corresponding preferred reception beam to decode the resource block, thereby ensuring the information transmission quality. For example, when the base station transmits the downlink control channel on the resource block with aggregation level 2 using the transmission beam c, it may transmit according to the resource block corresponding to the transmission beam c and the aggregation level 2 in the search space configuration. Correspondingly, when the UE carries out beam sweeping on the search space, it will select different reception beams to sweep respectively for different blind decoding candidate resource blocks with the aggregation levels 1, 2, 4, and 8, where, when the UE sweeps to the blind decoding candidate resource block with aggregation level 2 corresponding to the transmission beam c, a preferred reception beam 3 corresponding to the transmission beam c will be selected to decode the resource block, thereby obtaining the downlink control information.

Figure 18:
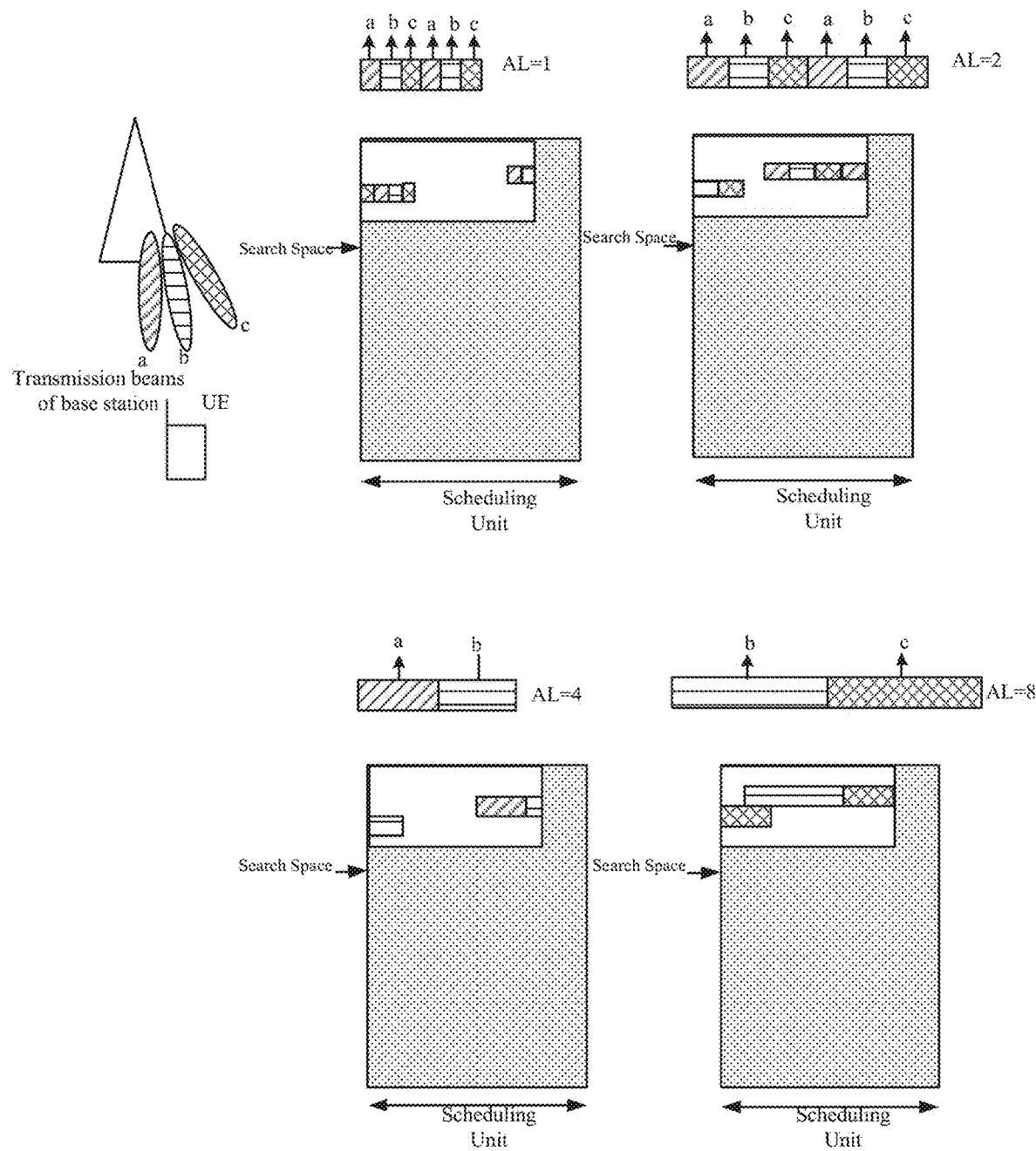
FIG. 18 shows a schematic diagram of a search space configuration of a blind decoding candidate resource block in a third embodiment of the present disclosure.

FIG. 18 shows a schematic diagram of the configuration of the relations between the blind decoding candidate resource blocks and the transmission beams of the base station in the embodiment of the present disclosure, and the order of the search space is first arranging the time domain resource and then the frequency domain resource. Similar to the example of FIG. 17, in the scheduling unit, the search space has different configurations corresponding to the aggregation levels AL=1, 2, 4, 8. As shown in FIG. 18, the base station side may also have three preferred transmission beams a, b, c for the user in total. When the aggregation level of the blind decoding candidate resource blocks is 1, six candidate resource blocks may respectively correspond to the three transmission beams a, b, and c of the base station, and each candidate resource block may include one time-frequency element. When the aggregation level is 2, each candidate resource block is twice the candidate resource block with aggregation level 1, and each includes two time-frequency elements, and the six candidate resource blocks may also correspond to the three transmission beams a, b, and c of the base station, respectively. When the aggregation level is 4, each candidate resource block is four times of the candidate resource block with aggregation level 1, and each includes four time-frequency elements, and the two candidate resource blocks respectively correspond to the two transmission beams a and b of the base station. When the aggregation level is 8, each candidate resource block is eight times of the candidate resource block with aggregation level 1, and each includes eight time-frequency elements, and the two candidate resource blocks respectively correspond to the two transmission beams b and c of the base station. When transmitting the downlink control information, the base station may determine the resource block corresponding to the second transmission beam according to the search space configuration in FIG. 17 after determining the aggregation level and the second transmission beam for transmitting the downlink control information. For example, when the base station, for example, determines to transmit the downlink information with a certain transmission beam as the second transmission beam according to channel condition, and the aggregation level is x, it may transmit according to the blind decoding candidate resource block with aggregation level x corresponding to the second transmission beam in the search space configuration. Correspondingly, when the UE carries out beam sweeping on the search space, for different blind decoding candidate resource blocks with different aggregation levels and their corresponding transmission beams, different reception beams will be selected to sweep. That is, for the resource block on which the base station actually transmits a downlink control channel, the UE will select the corresponding preferred reception beam to decode the resource block, thereby ensuring the information transmission quality. For example, when the base station transmits the downlink control channel on the resource block with aggregation level 2 using the transmission beam c, it may transmit according to the resource block corresponding to the transmission beam c and the aggregation level 2 in the search space configuration. Correspondingly, when the UE carries out beam sweeping on the search space, for different blind decoding candidate resource blocks with aggregation levels 1, 2, 4, and 8, different reception beams will be selected respectively to sweep, wherein, when the UE sweeps to the blind decoding candidate resource block with aggregation level 2 corresponding to the transmission beam c, a preferred reception beam 3 corresponding to the transmission beam c will be selected to decode the resource block, thereby obtaining the downlink control information.

In one embodiment of the present disclosure, when the base station transmits PDCCH interaction information through the transmission beams, the base station may have the following two options for the transmitting mode of a physical downlink shared channel (PDSCH): 1) carrying out the PDSCH transmission through the above second transmission beam; 2) indicating the transmission beam for PDSCH transmission by information that indicates beams included in the DCI transmitted by the second transmission beams, and transmitting downlink data information through the determined beam. Correspondingly, the UE also needs to separately determine the transmission beam of the base station for PDSCH transmission for the above two methods of the base station, and select the preferred reception beam corresponding thereto to receive. Wherein, for the first case, the DCI will not include information that indicates the beam, and the UE will judge that the PDSCH will transmit through the same second transmission beam as the PDCCH, and select the second reception beam to receive the downlink data information; and for the second case, when the UE decodes the DCI, the UE will determine the transmission beam of the PDSCH according to the information that indicates the beam included in the DCI and receive the downlink data information. The transmission beam may be a CSI-RS based beam or an SS block based beam. The information that indicates a beam in the PDCCH beam in a RRC configuration signaling used for configuring relations of a beam-search space time-frequency resources related to PDCCH beam sweeping, or in the DCI, may include one or more of beam information (beam-index), channel state information reference signal port (CSI-RS port), channel state information reference signal configuration (CSI-RS configuration) or CSI-RS index, beam reference signal configuration, codebook, code word, precoding information indication, spatial parameters or spatial relation information, and Synchronization Signal (SS) block index.

The demodulation method for the downlink transmission performed in the communication system according to the embodiment of the present disclosure can enable the user equipment to receive the downlink information transmitted by the base station with the preferred reception beam during beam sweeping through the preset search space configuration, thereby improving the transmission quality of the information in the communication network.

Hereinafter, the demodulation method of the downlink transmission performed by the base station according to the third embodiment of the present disclosure will be described. Since most of the operations of the method have been described above in describing the demodulation method for the downlink transmission performed by the UE, the description of the same content is omitted herein to avoid redundancy.

Figure 19:
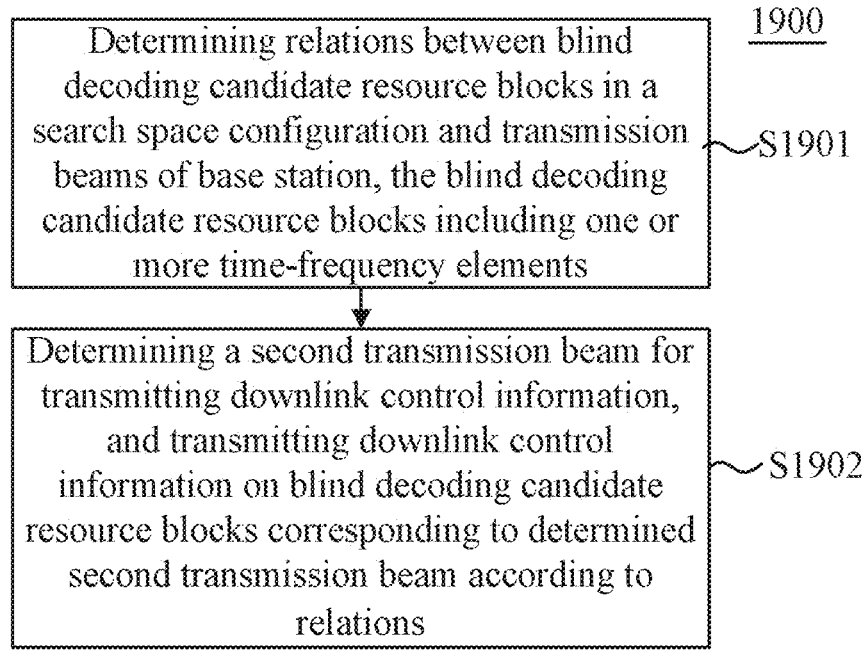
FIG. 19 shows a flowchart of a beam determination method performed by a base station according to a third embodiment of the present disclosure.

FIG. 19 shows the demodulation method of the downlink transmission performed by the base station according to the third embodiment of the present disclosure. Through this method, the base station may determine, according to the relations between the candidate control resource blocks (for example, may be the blind decoding candidate resource blocks) in the control information configuration (control resource configuration, for example, may be the search space configuration) and the transmission beams of the base station, the blind decoding candidate resource block corresponding to the transmission beam used by the base station for transmitting the downlink information, and transmit the downlink control information accordingly.

As shown in FIG. 19, in step S1901, the base station determines the relations between the blind decoding (BD) PDCCH candidate resource blocks in the search space configuration and the transmission beams of the base station, the blind decoding candidate resource blocks including one or more time-frequency elements. Specifically, the relations between the blind decoding candidate resource blocks in the search space configuration and the transmission beams of the base station may be configured by the base station, and notified to the UE by broadcast information (for example, MIB or SIB), or RRC signal, or may be predefined by the LTE specification.

In step S1902, the base station determines second transmission beam for transmitting the downlink control information, and transmits the downlink control information on the blind decoding candidate resource blocks corresponding to the determined second transmission beam according to the relations. Specifically, after determining the preconfigured relations between the blind decoding candidate resource blocks in the search space configuration and the transmission beams of the base station, the base station may select the second transmission beam for transmitting downlink information, and transmit the downlink control information on the blind decoding candidate resource block corresponding to the transmission beam according to the relations. After learning the preconfigured relations, for each blind decoding candidate resource block, the UE may judge the corresponding transmission beam of the base station according to the relations, and search and attempt to receive information on the blind decoding candidate resource block with the reception beam corresponding to the transmission beam, so as to receive the downlink control information and its corresponding blind decoding candidate resource block and the corresponding second transmission beam of the base station. When the UE does not receive the downlink control information on one blind decoding candidate resource block, it means that the base station does not select the transmission beam corresponding to the blind decoding candidate resource block to transmit information; and when the UE receives the downlink control information on one blind decoding candidate resource block, it means that the base station transmits the downlink control information with its corresponding second transmission beam. Since the UE has determined the transmission beam of the base station corresponding to the blind decoding candidate resource block according to the foregoing relations and has selected the preferred second reception beam corresponding to the second transmission beam to receive the information, the method of the embodiment of the present invention may ensure the communication quality of the communication system.

In one embodiment of the present disclosure, the blind decoding candidate resource blocks may have different aggregation levels (AL), and the blind decoding candidate resource blocks include different numbers of time-frequency elements at different aggregation levels. For example, there are four type aggregation levels in LTE, which are 1/2/4/8, respectively. In 5G the aggregation levels may be changed compared to the LTE. Certainly, the present invention is suitable for candidate resource blocks of the PDCCH of aggregation levels under any definition, and is also applicable to candidate resource blocks of the PDCCH that does not have the aggregation level. FIG. 17 shows a schematic diagram of a search space configuration of relations between the blind decoding candidate resource blocks and the transmission beams of the base station in the embodiment of the present disclosure. In a scheduling unit, the search space has different configurations corresponding to the aggregation levels AL=1, 2, 4, and 8. The candidate resource blocks may be inside the PDCCH region (that is, the search space) by first arranging a time domain resource and then a frequency domain resource, or may be inside the PDCCH region by first arranging the frequency domain resource and then the time domain resource. Wherein, FIG. 17 is an example of first arranging the time domain resource and then the frequency domain resource. As shown in FIG. 17, the base station side has three preferred transmission beams a, b, and c for the user in total. When the aggregation level of the blind decoding candidate resource blocks is 1, six candidate resource blocks may respectively correspond to the three transmission beams a, b, and c of the base station, and each candidate resource block may include one time-frequency element. When the aggregation level is 2, each candidate resource block is twice the candidate resource block with aggregation level 1, and each includes two time-frequency elements, and the six candidate resource blocks may also correspond to the three transmission beams a, b, and c of the base station, respectively. When the aggregation level is 4, each candidate resource block is four times of the candidate resource block with aggregation level 1, and each includes four time-frequency elements, and the two candidate resource blocks respectively correspond to the two transmission beams a and b of the base station. When the aggregation level is 8, each candidate resource block is eight times of the candidate resource block with aggregation level 1, and each includes eight time-frequency elements, and the two candidate resource blocks respectively correspond to the two transmission beams b and c of the base station. When transmitting the downlink control information, the base station may determine the resource block corresponding to the second transmission beam according to the search space configuration in FIG. 17 after determining the aggregation level and the second transmission beam for transmitting the downlink control information. For example, when the base station, for example, determines to transmit the downlink information with a certain transmission beam as the second transmission beam according to channel condition, and the aggregation level is x, it may transmit according to the blind decoding candidate resource block with aggregation level x corresponding to the second transmission beam in the search space configuration. Correspondingly, when the UE carries out beam sweeping on the search space, for different blind decoding candidate resource blocks with different aggregation levels and their corresponding transmission beams, different reception beams will be selected to sweep. That is, for the resource block on which the base station actually transmits the downlink control channel, the UE will select the corresponding preferred reception beam to decode the resource block, thereby ensuring the information transmission quality. For example, when the base station transmits the downlink control channel on the resource block with aggregation level 2 using the transmission beam c, it may transmit according to the resource block corresponding to the transmission beam c and the aggregation level 2 in the search space configuration. Correspondingly, when the UE carries out beam sweeping on the search space, for different blind decoding candidate resource blocks with aggregation levels 1, 2, 4, and 8, different reception beams will be selected respectively to sweep, wherein, when the UE sweeps to the blind decoding candidate resource block with aggregation level 2 corresponding to the transmission beam c, a preferred reception beam 3 corresponding to the transmission beam c will be selected to decode the resource block, thereby obtaining the downlink control information.

FIG. 18 shows a schematic diagram of the search space configuration of the relations between the blind decoding candidate resource blocks and the transmission beams of the base station in the embodiment of the present disclosure, and the order of the search space is first arranging the time domain resource and then the frequency domain resource. Similar to the example of FIG. 17, in the scheduling unit, the search space has different configurations corresponding to the aggregation levels AL=1, 2, 4, 8. As shown in FIG. 18, the base station side may also have three preferred transmission beams a, b, c for the user in total. When the aggregation level of the blind decoding candidate resource blocks is 1, six candidate resource blocks may respectively correspond to the three transmission beams a, b, and c of the base station, and each candidate resource block may include one time-frequency element. When the aggregation level is 2, each candidate resource block is twice the candidate resource block with aggregation level 1, and each includes two time-frequency elements, and the six candidate resource blocks may also correspond to the three transmission beams a, b, and c of the base station, respectively. When the aggregation level is 4, each candidate resource block is four times of the candidate resource block with aggregation level 1, and each includes four time-frequency elements, and the two candidate resource blocks respectively correspond to the two transmission beams a and b of the base station. When the aggregation level is 8, each candidate resource block is eight times of the candidate resource block with aggregation level 1, and each includes eight time-frequency elements, and the two candidate resource blocks respectively correspond to the two transmission beams b and c of the base station. When transmitting the downlink control information, the base station may determine the resource block corresponding to the second transmission beam according to the search space configuration in FIG. 17 after determining the aggregation level and the second transmission beam for transmitting the downlink control information. For example, when the base station, for example, determines to transmit the downlink information with a certain transmission beam as the second transmission beam according to channel condition, and the aggregation level is x, it may transmit according to the blind decoding candidate resource block with aggregation level x corresponding to the second transmission beam in the search space configuration. Correspondingly, when the UE carries out beam sweeping on the search space, for different blind decoding candidate resource blocks with different aggregation levels and their corresponding transmission beams, different reception beams will be selected to sweep. That is, for the resource block on which the base station actually transmits a downlink control channel, the UE will select the corresponding preferred reception beam to decode the resource block, thereby ensuring the information transmission quality. For example, when the base station transmits the downlink control channel on the resource block with aggregation level 2 using the transmission beam c, it may transmit according to the resource block corresponding to the transmission beam c and the aggregation level 2 in the search space configuration. Correspondingly, when the UE carries out beam sweeping on the search space, for different blind decoding candidate resource blocks with aggregation levels 1, 2, 4, and 8, different reception beams will be selected respectively to sweep, wherein, when the UE sweeps to the blind decoding candidate resource block with aggregation level 2 corresponding to the transmission beam c, a preferred reception beam 3 corresponding to the transmission beam c will be selected to decode the resource block, thereby obtaining the downlink control information.

In one embodiment of the present disclosure, when the base station transmits PDCCH interaction information through the transmission beams, the base station may have the following two options for the transmitting mode of a physical downlink shared channel (PDSCH): 1) carrying out the PDSCH transmission through the above the second transmission beam; 2) indicating the transmission beam for PDSCH transmission by information that indicates beams included in the DCI transmitted by the second transmission beams, and transmitting downlink data information through the determined beam. Correspondingly, the UE also needs to separately determine the transmission beam of the base station for PDSCH transmission for the above two methods of the base station, and select the preferred reception beam corresponding thereto to receive. Wherein, for the first case, the DCI will not include information that indicates the beam, and the UE will judge that the PDSCH will transmit through the same second transmission beam as the PDCCH, and select the second reception beam to receive the downlink data information; and for the second case, when the UE decodes the DCI, the UE will determine the transmission beam of the PDSCH according to the information that indicates the beam included in the DCI and receive the downlink data information. The transmission beam may be a CSI-RS based beam or an SS block based beam. The information that indicates a beam in the PDCCH beam in a RRC configuration signaling used for configuring relations of a beam-search space time-frequency resources related to PDCCH beam sweeping, or in the DCI, may include one or more of beam information (beam-index), channel state information reference signal port (CSI-RS port), channel state information reference signal configuration (CSI-RS configuration) or CSI-RS index, beam reference signal configuration, codebook, code word, precoding information indication, spatial parameters or spatial relation information, and Synchronization Signal (SS) block index.

The demodulation method for the downlink transmission performed in the communication system according to the embodiment of the present disclosure can enable the user equipment to receive the downlink information transmitted by the base station with the preferred reception beam during beam sweeping through the preset search space configuration, thereby improving the transmission quality of the information in the communication network.

Hereinafter, the UE according to the third embodiment of the present disclosure will be described with reference to FIG. 20. The UE may perform the demodulation method for the downlink transmission described above. Since the operation of the UE is substantially the same as respective steps of the demodulation method for the downlink transmission described above, only a brief description thereof is made herein, and a repeated description of the same content is omitted.

Figure 20:
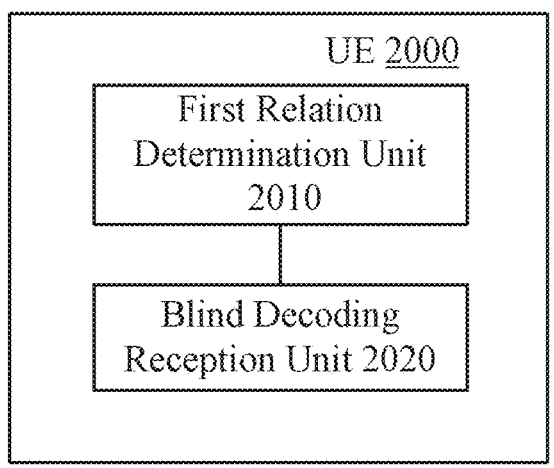
FIG. 20 shows a block diagram of a structure of a UE of a third embodiment of the present disclosure.

As shown in FIG. 20, a UE 2000 includes a first relation determination unit 2010 and a blind decoding reception unit 2020. It needs to be appreciated that FIG. 20 only shows means related to embodiments of the present disclosure, while other means are omitted, but this is merely illustrative, and the UE 2000 may include other means as needed.

The first relation determination unit 2010 may determine the relations between the candidate control resource blocks (for example, may be the blind decoding (BD) PDCCH candidate resource blocks) in the control information configuration (control resource configuration, for example, may be the search space configuration) and the transmission beams of the base station, the blind decoding candidate resource blocks including one or more time-frequency elements. Specifically, the relations between the blind decoding candidate resource blocks in the search space configuration and the transmission beams of the base station may be configured by the base station, and notified to the UE by broadcast information (for example, MIB or SIB), or RRC signal, or may be predefined by the LTE specification.

The blind decoding reception unit 2020 may determine, on each blind decoding PDCCH candidate resource block according to the relations, the transmission beam of the base station, and receive, with the reception beams corresponding to the transmission beams of the base station, each blind decoding PDCCH candidate resource block, to obtain blind decoding candidate resource blocks corresponding to the downlink control information and the corresponding second transmission beam. Specifically, after determining the preconfigured relations between the blind decoding candidate resource blocks in the search space configuration and the transmission beams of the base station, the base station may select the second transmission beam for transmitting downlink information, and transmit the downlink control information on the blind decoding candidate resource block corresponding to the transmission beam according to the relations. After learning the preconfigured relations, for each blind decoding candidate resource block, the blind decoding reception unit 2020 may judge the corresponding transmission beam of the base station according to the relations, and search and attempt to receive information on the blind decoding candidate resource block with the reception beam corresponding to the transmission beam, so as to receive the downlink control information and its corresponding blind decoding candidate resource block and the corresponding second transmission beam of the base station. When the blind decoding reception unit 2020 does not receive the downlink control information on one blind decoding candidate resource block, it means that the base station does not select the transmission beam corresponding to the blind decoding candidate resource block to transmit information; and when the blind decoding reception unit 2020 receives the downlink control information on one blind decoding candidate resource block, it means that the base station transmits the downlink control information with its corresponding second transmission beam. Since the blind decoding reception unit 2020 has determined the transmission beam of the base station corresponding to the blind decoding candidate resource block according to the foregoing relations and has selected the preferred second reception beam corresponding to the second transmission beam to receive the information, the method of the embodiment of the present invention may ensure the communication quality of the communication system.

In one embodiment of the present disclosure, the blind decoding candidate resource blocks may have different aggregation levels (AL), and the blind decoding candidate resource blocks include different numbers of time-frequency elements at different aggregation levels. For example, there are four type aggregation levels in LTE, which are 1/2/4/8, respectively. In 5G the aggregation levels may be changed compared to the LTE. Certainly, the present invention is suitable for candidate resource blocks of the PDCCH of aggregation levels under any definition, and is also applicable to candidate resource blocks of the PDCCH that does not have the aggregation level. FIG. 17 shows a schematic diagram of a search space configuration of relations between the blind decoding candidate resource blocks and the transmission beams of the base station in the embodiment of the present disclosure. In a scheduling unit, the search space has different configurations corresponding to the aggregation levels AL=1, 2, 4, and 8. The candidate resource blocks may be inside the PDCCH region, that is, the search space, by first arranging a time domain resource and then a frequency domain resource, or may be inside the PDCCH region by first arranging the frequency domain resource and then the time domain resource. Wherein, FIG. 17 is an example of first arranging the time domain resource and then the frequency domain resource. As shown in FIG. 17, the base station side has three preferred transmission beams a, b, and c for the user in total. When the aggregation level of the blind decoding candidate resource blocks is 1, six candidate resource blocks may respectively correspond to the three transmission beams a, b, and c of the base station, and each candidate resource block may include one time-frequency element. When the aggregation level is 2, each candidate resource block is twice the candidate resource block with aggregation level 1, and each includes two time-frequency elements, and the six candidate resource blocks may also correspond to the three transmission beams a, b, and c of the base station, respectively. When the aggregation level is 4, each candidate resource block is four times of the candidate resource block with aggregation level 1, and each includes four time-frequency elements, and the two candidate resource blocks respectively correspond to the two transmission beams a and b of the base station. When the aggregation level is 8, each candidate resource block is eight times of the candidate resource block with aggregation level 1, and each includes eight time-frequency elements, and the two candidate resource blocks respectively correspond to the two transmission beams b and c of the base station. When transmitting the downlink control information, the base station may determine the resource block corresponding to the second transmission beam according to the search space configuration in FIG. 17 after determining the aggregation level and the second transmission beam for transmitting the downlink control information. For example, when the base station, for example, determines to transmit the downlink information with a certain transmission beam as the second transmission beam according to channel condition, and the aggregation level is x, it may transmit according to the blind decoding candidate resource block with aggregation level x corresponding to the second transmission beam in the search space configuration. Correspondingly, when the UE carries out beam sweeping on the search space, for different blind decoding candidate resource blocks with different aggregation levels and their corresponding transmission beams, different reception beams will be selected to sweep. That is, for the resource block on which the base station actually transmits the downlink control channel, the UE will select the corresponding preferred reception beam to decode the resource block, thereby ensuring the information transmission quality. For example, when the base station transmits the downlink control channel on the resource block with aggregation level 2 using the transmission beam c, it may transmit according to the resource block corresponding to the transmission beam c and the aggregation level 2 in the search space configuration. Correspondingly, when the UE carries out beam sweeping on the search space, for different blind decoding candidate resource blocks with aggregation levels 1, 2, 4, and 8, different reception beams will be selected respectively to sweep, wherein, when the UE sweeps to the blind decoding candidate resource block with aggregation level 2 corresponding to the transmission beam c, a preferred reception beam 3 corresponding to the transmission beam c will be selected to decode the resource block, thereby obtaining the downlink control information.

FIG. 18 shows a schematic diagram of the search space configuration of the relations between the blind decoding candidate resource blocks and the transmission beams of the base station in the embodiment of the present disclosure, and the order of the search space is first arranging the time domain resource and then the frequency domain resource. Similar to the example of FIG. 17, in the scheduling unit, the search space has different configurations corresponding to the aggregation levels AL=1, 2, 4, 8. As shown in FIG. 18, the base station side may also have three preferred transmission beams a, b, c for the user in total. When the aggregation level of the blind decoding candidate resource blocks is 1, six candidate resource blocks may respectively correspond to the three transmission beams a, b, and c of the base station, and each candidate resource block may include one time-frequency element. When the aggregation level is 2, each candidate resource block is twice the candidate resource block with aggregation level 1, and each includes two time-frequency elements, and the six candidate resource blocks may also correspond to the three transmission beams a, b, and c of the base station, respectively. When the aggregation level is 4, each candidate resource block is four times of the candidate resource block with aggregation level 1, and each includes four time-frequency elements, and the two candidate resource blocks respectively correspond to the two transmission beams a and b of the base station. When the aggregation level is 8, each candidate resource block is eight times of the candidate resource block with aggregation level 1, and each includes eight time-frequency elements, and the two candidate resource blocks respectively correspond to the two transmission beams b and c of the base station. When transmitting the downlink control information, the base station may determine the resource block corresponding to the second transmission beam according to the search space configuration in FIG. 17 after determining the aggregation level and the second transmission beam for transmitting the downlink control information. For example, when the base station, for example, determines to transmit the downlink information with a certain transmission beam as the second transmission beam according to channel condition, and the aggregation level is x, it may transmit according to the blind decoding candidate resource block with aggregation level x corresponding to the second transmission beam in the search space configuration. Correspondingly, when the UE carries out beam sweeping on the search space, for different blind decoding candidate resource blocks with different aggregation levels and their corresponding transmission beams, different reception beams will be selected to sweep. That is, for the resource block on which the base station actually transmits a downlink control channel, the UE will select the corresponding preferred reception beam to decode the resource block, thereby ensuring the information transmission quality. For example, when the base station transmits the downlink control channel on the resource block with aggregation level 2 using the transmission beam c, it may transmit according to the resource block corresponding to the transmission beam c and the aggregation level 2 in the search space configuration. Correspondingly, when the UE carries out beam sweeping on the search space, for different blind decoding candidate resource blocks with aggregation levels 1, 2, 4, and 8, different reception beams will be selected respectively to sweep, wherein, when the UE sweeps to the blind decoding candidate resource block with aggregation level 2 corresponding to the transmission beam c, a preferred reception beam 3 corresponding to the transmission beam c will be selected to decode the resource block, thereby obtaining the downlink control information.

In one embodiment of the present disclosure, when the base station transmits PDCCH interaction information through the transmission beams, the base station may have the following two options for the transmitting mode of a physical downlink shared channel (PDSCH): 1) carrying out the PDSCH transmission through the above the second transmission beam; 2) indicating the transmission beam for PDSCH transmission by information that indicates beams included in the DCI transmitted by the second transmission beams, and transmitting downlink data information through the determined beam. Correspondingly, the blind decoding reception unit 2020 of the UE also needs to separately determine the transmission beam of the base station for PDSCH transmission for the above two methods of the base station, and select the preferred reception beam corresponding thereto to receive. Wherein, for the first case, the DCI will not include information that indicates the beam, and the blind decoding reception unit 2020 of the UE will judge that the PDSCH will transmit through the same second transmission beam as the PDCCH, and select the second reception beam to receive the downlink data information; and for the second case, when the blind decoding reception unit 2020 of the UE decodes the DCI, the UE will determine the transmission beam of the PDSCH according to the information that indicates the beam included in the DCI and receive the downlink data information. The transmission beam may be a CSI-RS based beam or an SS block based beam. The information that indicates a beam in the PDCCH beam in a RRC configuration signaling used for configuring relations of a beam-search space time-frequency resources related to PDCCH beam sweeping, or in the DCI, may include one or more of beam information (beam-index), channel state information reference signal port (CSI-RS port), channel state information reference signal configuration (CSI-RS configuration) or CSI-RS index, beam reference signal configuration, codebook, code word, precoding information indication, spatial parameters or spatial relation information, and Synchronization Signal (SS) block index.

The UE in the communication system according to the embodiment of the present disclosure can enable the user equipment to receive the downlink information transmitted by the base station with the preferred reception beam during beam sweeping through the preset search space configuration, thereby improving the transmission quality of the information in the communication network.

Hereinafter, the base station according to the third embodiment of the present disclosure will be described with reference to FIG. 21. The base station may perform the demodulation method for the downlink transmission described above. Since the operation of the base station is substantially the same as respective steps of the demodulation method for the downlink transmission described above, only a brief description thereof is made herein, and a repeated description of the same content is omitted.

Figure 21:
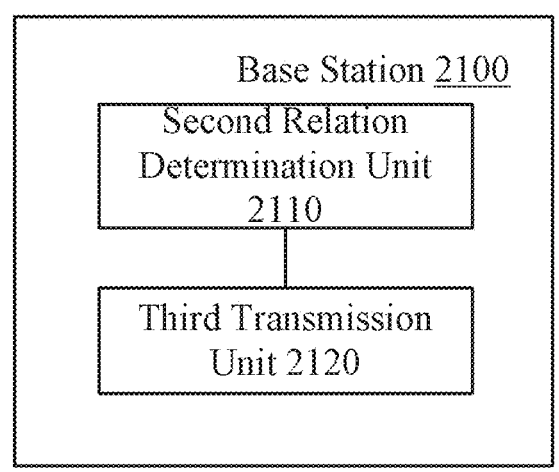
FIG. 21 shows a block diagram of a structure of a base station of a third embodiment of the present disclosure.

As shown in FIG. 21, a base station 2100 includes a second relation determination unit 2110 and a third transmission unit 2120. It needs to be appreciated that FIG. 21 only shows means related to the embodiments of the present disclosure, while other means are omitted, but this is merely illustrative, and the base station 2100 may include other means as needed.

The second relation determination unit 2110 can be used for determining the relations between the candidate control resource blocks (for example, may be the blind decoding (BD) PDCCH candidate resource blocks) in the control information configuration (control resource configuration, for example, may be the search space configuration) and the transmission beams of the base station, the blind decoding candidate resource blocks including one or more time-frequency elements. Specifically, the relations between the blind decoding candidate resource blocks in the search space configuration and the transmission beams of the base station may be configured by the base station, and notified to the UE by broadcast information (for example, MIB or SIB), or RRC signal, or may be predefined by the LTE specification.

The third transmission unit 2120 determines second transmission beam for transmitting the downlink control information, and transmits the downlink control information on the blind decoding candidate resource blocks corresponding to the determined second transmission beam according to the relations. Specifically, after determining the preconfigured relations between the blind decoding candidate resource blocks in the search space configuration and the transmission beams of the base station, the third transmission unit 2120 may select the second transmission beam for transmitting downlink information, and transmit the downlink control information on the blind decoding candidate resource block corresponding to the transmission beam according to the relations. After learning the preconfigured relations, for each blind decoding candidate resource block, the UE may judge the corresponding transmission beam of the base station according to the relations, and search and attempt to receive information on the blind decoding candidate resource block with the reception beam corresponding to the transmission beam, so as to receive the downlink control information and its corresponding blind decoding candidate resource block and the corresponding second transmission beam of the base station. When the UE does not receive the downlink control information on one blind decoding candidate resource block, it means that the base station does not select the transmission beam corresponding to the blind decoding candidate resource block to transmit information; and when the UE receives the downlink control information on one blind decoding candidate resource block, it means that the base station transmits the downlink control information with its corresponding second transmission beam. Since the UE has determined the transmission beam of the base station corresponding to the blind decoding candidate resource block according to the foregoing relations and has selected the preferred second reception beam corresponding to the second transmission beam to receive the information, the method of the embodiment of the present invention may ensure the communication quality of the communication system.

In one embodiment of the present disclosure, the blind decoding candidate resource blocks may have different aggregation levels (AL), and the blind decoding candidate resource blocks include different numbers of time-frequency elements at different aggregation levels. For example, there are four type aggregation levels in LTE, which are 1/2/4/8, respectively. In 5G the aggregation levels may be changed compared to the LTE. Certainly, the present invention is suitable for candidate resource blocks of the PDCCH of aggregation levels under any definition, and is also applicable to candidate resource blocks of the PDCCH that does not have the aggregation level. FIG. 17 shows a schematic diagram of a search space configuration of relations between the blind decoding candidate resource blocks and the transmission beams of the base station in the embodiment of the present disclosure. In a scheduling unit, the search space has different configurations corresponding to the aggregation levels AL=1, 2, 4, and 8. The candidate resource blocks may be inside the PDCCH region, that is, the search space, by first arranging a time domain resource and then a frequency domain resource, or may be inside the PDCCH region by first arranging the frequency domain resource and then the time domain resource. Wherein, FIG. 17 is an example of first arranging the time domain resource and then the frequency domain resource. As shown in FIG. 17, the base station side has three preferred transmission beams a, b, and c for the user in total. When the aggregation level of the blind decoding candidate resource blocks is 1, six candidate resource blocks may respectively correspond to the three transmission beams a, b, and c of the base station, and each candidate resource block may include one time-frequency element. When the aggregation level is 2, each candidate resource block is twice the candidate resource block with aggregation level 1, and each includes two time-frequency elements, and the six candidate resource blocks may also correspond to the three transmission beams a, b, and c of the base station, respectively. When the aggregation level is 4, each candidate resource block is four times of the candidate resource block with aggregation level 1, and each includes four time-frequency elements, and the two candidate resource blocks respectively correspond to the two transmission beams a and b of the base station. When the aggregation level is 8, each candidate resource block is eight times of the candidate resource block with aggregation level 1, and each includes eight time-frequency elements, and the two candidate resource blocks respectively correspond to the two transmission beams b and c of the base station. When transmitting the downlink control information, the base station may determine the resource block corresponding to the second transmission beam according to the search space configuration in FIG. 17 after determining the aggregation level and the second transmission beam for transmitting the downlink control information. For example, when the base station, for example, determines to transmit the downlink information with a certain transmission beam as the second transmission beam according to channel condition, and the aggregation level is x, it may transmit according to the blind decoding candidate resource block with aggregation level x corresponding to the second transmission beam in the search space configuration. Correspondingly, when the UE carries out beam sweeping on the search space, for different blind decoding candidate resource blocks with different aggregation levels and their corresponding transmission beams, different reception beams will be selected to sweep. That is, for the resource block on which the base station actually transmits the downlink control channel, the UE will select the corresponding preferred reception beam to decode the resource block, thereby ensuring the information transmission quality. For example, when the base station transmits the downlink control channel on the resource block with aggregation level 2 using the transmission beam c, it may transmit according to the resource block corresponding to the transmission beam c and the aggregation level 2 in the search space configuration. Correspondingly, when the UE carries out beam sweeping on the search space, for different blind decoding candidate resource blocks with aggregation levels 1, 2, 4, and 8, different reception beams will be selected respectively to sweep, wherein, when the UE sweeps to the blind decoding candidate resource block with aggregation level 2 corresponding to the transmission beam c, a preferred reception beam 3 corresponding to the transmission beam c will be selected to decode the resource block, thereby obtaining the downlink control information.

FIG. 18 shows a schematic diagram of the search space configuration of the relations between the blind decoding candidate resource blocks and the transmission beams of the base station in the embodiment of the present disclosure, and the order of the search space is first arranging the time domain resource and then the frequency domain resource. Similar to the example of FIG. 17, in the scheduling unit, the search space has different configurations corresponding to the aggregation levels AL=1, 2, 4, 8. As shown in FIG. 18, the base station side may also have three preferred transmission beams a, b, c for the user in total. When the aggregation level of the blind decoding candidate resource blocks is 1, six candidate resource blocks may respectively correspond to the three transmission beams a, b, and c of the base station, and each candidate resource block may include one time-frequency element. When the aggregation level is 2, each candidate resource block is twice the candidate resource block with aggregation level 1, and each includes two time-frequency elements, and the six candidate resource blocks may also correspond to the three transmission beams a, b, and c of the base station, respectively. When the aggregation level is 4, each candidate resource block is four times of the candidate resource block with aggregation level 1, and each includes four time-frequency elements, and the two candidate resource blocks respectively correspond to the two transmission beams a and b of the base station. When the aggregation level is 8, each candidate resource block is eight times of the candidate resource block with aggregation level 1, and each includes eight time-frequency elements, and the two candidate resource blocks respectively correspond to the two transmission beams b and c of the base station. When transmitting the downlink control information, the base station may determine the resource block corresponding to the second transmission beam according to the search space configuration in FIG. 17 after determining the aggregation level and the second transmission beam for transmitting the downlink control information. For example, when the base station, for example, determines to transmit the downlink information with a certain transmission beam as the second transmission beam according to channel condition, and the aggregation level is x, it may transmit according to the blind decoding candidate resource block with aggregation level x corresponding to the second transmission beam in the search space configuration. Correspondingly, when the UE carries out beam sweeping on the search space, for different blind decoding candidate resource blocks with different aggregation levels and their corresponding transmission beams, different reception beams will be selected to sweep. That is, for the resource block on which the base station actually transmits a downlink control channel, the UE will select the corresponding preferred reception beam to decode the resource block, thereby ensuring the information transmission quality. For example, when the base station transmits the downlink control channel on the resource block with aggregation level 2 using the transmission beam c, it may transmit according to the resource block corresponding to the transmission beam c and the aggregation level 2 in the search space configuration. Correspondingly, when the UE carries out beam sweeping on the search space, for different blind decoding candidate resource blocks with aggregation levels 1, 2, 4, and 8, different reception beams will be selected respectively to sweep, wherein, when the UE sweeps to the blind decoding candidate resource block with aggregation level 2 corresponding to the transmission beam c, a preferred reception beam 3 corresponding to the transmission beam c will be selected to decode the resource block, thereby obtaining the downlink control information.

In one embodiment of the present disclosure, when the third transmission unit 2120 of the base station transmits PDCCH interaction information through the transmission beams, the base station may have the following two options for the transmitting mode of a physical downlink shared channel (PDSCH): 1) carrying out the PDSCH transmission through the above the second transmission beam; 2) indicating the transmission beam for PDSCH transmission by information that indicates beams included in the DCI transmitted by the second transmission beams, and transmitting downlink data information through the determined beam. Correspondingly, the UE also needs to separately determine the transmission beam of the base station for PDSCH transmission for the above two methods of the base station, and select the preferred reception beam corresponding thereto to receive. Wherein, for the first case, the DCI transmitted by the third transmission unit 2120 will not include information that indicates the beam, and the UE will judge that the PDSCH will transmit through the same second transmission beam as the PDCCH, and select the second reception beam to receive the downlink data information; and for the second case, when the UE decodes the DCI, the UE will determine the transmission beam of the PDSCH according to the information that indicates the beam included in the DCI and receive the downlink data information. The transmission beam may be a CSI-RS based beam or an SS block based beam. The information that indicates a beam in the PDCCH beam in a RRC configuration signaling used for configuring relations of a beam-search space time-frequency resources related to PDCCH beam sweeping, or in the DCI, may include one or more of beam information (beam-index), channel state information reference signal port (CSI-RS port), channel state information reference signal configuration (CSI-RS configuration) or CSI-RS index, beam reference signal configuration, codebook, code word, precoding information indication, spatial parameters or spatial relation information, and Synchronization Signal (SS) block index.

The base station in the communication system according to the embodiment of the present disclosure can enable the user equipment to receive the downlink information transmitted by the base station with the preferred reception beam during beam sweeping through the preset search space configuration, thereby improving the transmission quality of the information in the communication network.

It should be noted that, in this specification, the terms "comprise", "include" or any other variants are intended to cover a non-exclusive inclusion, so that a process, method, item, or device that comprises a series of elements includes not only those elements, but also other elements not explicitly listed, or also includes elements that are inherent to the process, method, item, or device. In the absence of more restrictions, an element that is defined by the phrase "comprising a . . . " does not exclude the presence of additional equivalent elements in the process, method, item, or device that comprises the elements.

Finally, it should also be noted that the series of processes described above include not only processes that are performed in time series in the order described herein, but also processes that are performed in parallel or separately, rather than in chronological order.

Through the description of the above embodiments, those skilled in the art may clearly understand that the present disclosure may be implemented by means of software plus a necessary hardware platform, and certainly, may be implemented by hardware entirely. Based on such understanding, all or part of the technical solutions of the present disclosure contributing to the background may be embodied in the form of a computer software product, and the computer software product may be stored in a storage medium such as a ROM/RAM, a magnetic disk, an optical disk, or the like, and includes instructions for causing one computer device, which may be a personal computer, a server, or a network device, or the like, to perform the methods described in various embodiments or portions of the embodiments of the present disclosure.

The present disclosure has been described in detail above. The specific embodiments are used herein to explain the principles and implementations of the present disclosure. The description of the above embodiments is only for helping to understand the method and the core ideas of the present disclosure. At the same time, for those skilled in the art, there may be changes in the specific implementations and application scopes according to the idea of the present disclosure. In conclusion, the content of the specification should not be construed as limitation of the present disclosure.

What is claimed is:

1. A user equipment communicating with a base station, the base station having a plurality of transmission beams, wherein the user equipment comprising:
   a receiver for receiving downlink control information sent by the base station through a physical downlink control channel; and
   a processor for determining,
      when the received downlink control information contains information for indicating beam, a transmission beam for the base station to transmit data through a physical downlink shared channel according to received information for indicating beam included in the downlink control information, and
      when the received downlink control information does not contain information for indicating beam, a transmission beam for the base station to transmit data through a physical downlink shared channel, is the same as a transmission beam for transmitting information through at least one control resource set of a plurality of control resource sets.

2. The user equipment of claim 1, wherein
the transmission beam of the base station is a beam based on a channel state information reference signal or a beam based on a synchronization signal block.

3. The user equipment of claim 1, wherein
the information for indicating beam included in the downlink control information includes one or more of beam information, channel state information reference signal configuration and synchronization signal block index.

4. The user equipment of claim 1, wherein
the processor further determines, when the received downlink control information does not contain information for indicating beam, a transmission beam for the base station to transmit data through a physical downlink shared channel, is the same as a transmission beam for transmitting information through at least one search space of a plurality of search spaces.

5. The user equipment of claim 1, wherein
the processor further determines, when the received downlink control information does not contain information for indicating beam, a transmission beam for the base station to transmit data through a physical downlink shared channel, is the same as a transmission beam for transmitting information through a physical downlink control channel used to schedule the physical downlink shared channel.

* * * * *